US012278986B2

(12) United States Patent
Zhang et al.

(10) Patent No.: US 12,278,986 B2
(45) Date of Patent: Apr. 15, 2025

(54) TEMPLATE MATCHING-BASED ADVANCED MOTION VECTOR PREDICTOR (AMVP) CANDIDATE LIST CONSTRUCTION WITH NON-ADJACENT CANDIDATES AND AMVP INDEX SIGNALING

(71) Applicant: QUALCOMM Incorporated, San Diego, CA (US)

(72) Inventors: Yan Zhang, San Diego, CA (US); Zhi Zhang, Munich (DE); Vadim Seregin, San Diego, CA (US); Marta Karczewicz, San Diego, CA (US); Chun-Chi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/514,588

(22) Filed: Nov. 20, 2023

(65) Prior Publication Data

US 2024/0089492 A1    Mar. 14, 2024

Related U.S. Application Data

(63) Continuation of application No. 17/704,689, filed on Mar. 25, 2022, now Pat. No. 11,895,321.

(Continued)

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/55* (2014.11); *H04N 19/70* (2014.11); *H04N 19/176* (2014.11)

(58) Field of Classification Search
CPC ....... H04N 19/52; H04N 19/105; H04N 19/70
See application file for complete search history.

(56) References Cited

U.S. PATENT DOCUMENTS 8,115,763 B2    2/2012    Woop et al.
9,183,667 B2    11/2015   Garanzha
(Continued)

FOREIGN PATENT DOCUMENTS

KR    20190142717 A    12/2019
WO    2018231700 A1    12/2018
(Continued)

OTHER PUBLICATIONS

Bossen F., "Merge branch 'CheckingNoOutputBeforeRecoveryPicFlagBeforeNotOutputtingDPBPic' into 'master'", VVC VTM Reference Software, Retrieved on Apr. 20, 2022, pp. 1-3, URL: https://vcgit.hhi.fraunhofer.de/jvet/VVCSoftware_VTM.

(Continued)

*Primary Examiner* — Richard T Torrente
(74) *Attorney, Agent, or Firm* — Shumaker & Sieffert, PA

(57) ABSTRACT

An example device includes memory configured to store the video data and one or more processors implemented in circuitry and communicatively coupled to the memory. The one or more processors are configured to determine at least one of a temporal candidate or a history-based candidate and determine at least one non-adjacent candidate, wherein the at least one non-adjacent candidate is from a unit that is not adjacent to a current prediction unit (PU). The one or more processors are configured to determine an advanced motion vector predictor (AMVP) candidate list including the at least one of the temporal candidate or the history-based candidate and the at least one non-adjacent candidate. The at least one non-adjacent candidate is added to the AMVP candidate list after the temporal candidate or before the history-based (Continued)

candidate. The one or more processors are configured to code the current PU based on the AMVP candidate list.

36 Claims, 12 Drawing Sheets

Related U.S. Application Data

(60) Provisional application No. 63/167,555, filed on Mar. 29, 2021.

(51) Int. Cl.
*H04N 19/55* (2014.01)
*H04N 19/70* (2014.01)
*H04N 19/176* (2014.01)

(56) References Cited

U.S. PATENT DOCUMENTS

| | | | |
|---|---|---|---|
| 10,362,330 B1* | 7/2019 | Li | H04N 19/44 |
| 11,528,501 B2* | 12/2022 | Zhang | H04N 19/105 |
| 11,558,607 B2* | 1/2023 | Kotra | H04N 19/176 |
| 2015/0085935 A1* | 3/2015 | Chen | H04N 19/597 375/240.16 |
| 2020/0099951 A1* | 3/2020 | Hung | H04N 19/159 |
| 2020/0137413 A1 | 4/2020 | Esenlik et al. | |
| 2020/0195959 A1 | 6/2020 | Zhang et al. | |
| 2020/0221116 A1 | 7/2020 | Chen et al. | |
| 2020/0302676 A1 | 9/2020 | Laine et al. | |
| 2021/0005009 A1 | 1/2021 | Vaidyanathan et al. | |
| 2021/0058624 A1 | 2/2021 | Esenlik et al. | |
| 2021/0090319 A1 | 3/2021 | Muthler et al. | |
| 2021/0120262 A1 | 4/2021 | Chen et al. | |
| 2022/0312030 A1 | 9/2022 | Zhang et al. | |

FOREIGN PATENT DOCUMENTS

| | | |
|---|---|---|
| WO | 2019201264 A1 | 10/2019 |
| WO | 2020008347 A1 | 1/2020 |
| WO | 2020033321 A1 | 2/2020 |

OTHER PUBLICATIONS

Bross B., et al., "Versatile Video Coding Editorial Refinements on Draft 10", JVET-T2001-v1, Joint Video Experts Team (JVET) of ITU-T SG 16 WP 3 and ISO/IEC JTC 1/SC 29, 20th Meeting, by Teleconference, Oct. 7-16, 2020, pp. 1-514.
Chang Y.-J., et al., "Compression Efficiency Methods Beyond VVC", JVET-U0100, Joint Video Experts Team (JVET) of ITU-T SG 16 WP 3 and ISO/IEC JTC 1/SC 29, 21st Meeting, by Teleconference, Jan. 6-15, 2021, XP030293237, Dec. 31, 2020, pp. 1-13, sections 3.2 and 3.3, abstract, Section 5.
Chen J., et al., "Algorithm Description for Versatile Video Coding and Test Model 11 (VTM 11)", 20th JVET Meeting, 20201007-20201016, Teleconference, (The Joint Video Exploration Team of ISO/IEC JTC1/SC29/WG11 and ITU-T SG.16), No. JVET-T2002-v1, 132. MPEG Meeting, Oct. 12-Oct. 16, 2020, Online, (Motion Picture Expert Group or ISO/IEC JTC1/SC29/WG11), No. m55626, Dec. 14, 2020 (Dec. 14, 2020), XP030293335, pp. 1-102.
Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.
Chiu Y-J., et al., "CE1: Report of Self Derivation of Motion Estimation in TMuC 0.9", 4. JCT-VC Meeting, 95. MPEG Meeting, Jan. 20, 2011-Jan. 28, 2011, Daegu, (Joint Collaborative Team on Video Coding of ISO/IEC JTC1/SC29/ WG11AND ITU-T SG.16), No. JCTVC-D167, Jan. 16, 2011, XP030008207, 14 Pages, Section 2.
International Search Report and Written Opinion—PCT/US2022/022143—ISA/EPO—Oct. 20, 2022.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Partial International Search Report—PCT/US2022/022143—ISA/EPO—Jul. 8, 2022.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, 20120101, 20 pages.
Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, No. JCTVC-N1003_v1, 14th Meeting, Vienna, AT, Jul. 25-Aug. 2, 2013, 311 Pages, Please consider section 8.5.3.2.6 on p. 125, section 8.5.3.2.7 on pp. 126-129, and section 8.5.3.2.8 on pp. 129 and 130.
Zhang L., et al., "History-Based Motion Vector Prediction in Versatile Video Coding", 2019 Data Compression Conference, IEEE, Mar. 26, 2019, XP033548557, pp. 43-52.

* cited by examiner

TEMPLATE MATCHING-BASED ADVANCED MOTION VECTOR PREDICTOR (AMVP) CANDIDATE LIST CONSTRUCTION WITH NON-ADJACENT CANDIDATES AND AMVP INDEX SIGNALING

This application is a continuation of U.S. patent application Ser. No. 17/704,689, filed on Mar. 25, 2022, which claims the benefit of U.S. Provisional Application No. 63/167,555, filed Mar. 29, 2021, the entire content of both of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards, as well as proprietary video codecs/formats, such as AOMedia Video 1 (AV1), developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice or a video tile (e.g., a video picture or a portion of a video picture) may be partitioned into video blocks, which may also be referred to as coding blocks, superblocks, coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for construction of an advanced motion vector predictor (AMVP) candidate list and AMVP index signaling. Such techniques may be applied to any existing video codecs, such as HEVC (High Efficiency Video Coding), VVC (Versatile Video Coding), or Essential Video Coding (EVC), or may be an efficient coding tool in future video coding standards, as well as for proprietary video codecs/formats. For example, the AMVP candidate list may include one or more non-adjacent candidates that are derived from units/blocks that are not adjacent to a current prediction unit (PU). By including one or more non-adjacent candidate in the AMVP candidate list, the motion information of the candidates in the AMVP candidate list may be more diverse, which may improve coding efficiency. Units or blocks, e.g., prediction units from which candidates (e.g., comprising candidate motion information such as motion vectors) of the AMVP candidate list are derived or determined, may also be referred to herein as candidate units or PUs.

In one example, a method includes determining at least one of a temporal candidate or a history-based candidate; determining at least one non-adjacent candidate from at least one non-adjacent candidate unit, wherein the at least one non-adjacent candidate unit is not adjacent to a current prediction unit (PU); determining an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and coding the current PU based on the AMVP candidate list.

In another example, a device includes memory configured to store the video data; and one or more processors implemented in circuitry and communicatively coupled to the memory, the one or more processors being configured to: determine at least one of a temporal candidate or a history-based candidate; determine at least one non-adjacent candidate from at least one non-adjacent candidate unit, wherein the at least one non-adjacent candidate unit is not adjacent to a current prediction unit (PU); determine an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and code the current PU based on the AMVP candidate list.

In another example, a non-transitory computer-readable storage medium stores instructions that, when executed, cause one or more processors to: determine at least one of a temporal candidate or a history-based candidate; determine at least one non-adjacent candidate from at least one non-adjacent candidate unit, wherein the at least one non-adjacent candidate unit is not adjacent to a current prediction unit (PU); determine an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and code the current PU based on the AMVP candidate list.

In another example, a device includes means for determining at least one of a temporal candidate or a history-based candidate; means for determining at least one non-adjacent candidate from at least one non-adjacent candidate unit, wherein the at least one non-adjacent candidate unit is not adjacent to a current prediction unit (PU); means for determining an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and means for coding the current PU based on the AMVP candidate list.

In another example, a method includes determining an advanced motion vector predictor (AMVP) candidate, wherein at least one candidate in the AMVP candidate list is derived from a non-adjacent candidate unit, and wherein the non-adjacent candidate unit is not adjacent to a current prediction unit (PU); and coding the current PU based on the AMVP candidate list.

In another example, a device includes memory configured to store video data and one or more processors implemented in circuitry and communicatively coupled to the memory, the one or more processors being configured to perform any of the techniques of this disclosure.

In another example, a device includes at least one means for performing any of the techniques of this disclosure.

In another example, a computer-readable storage medium is encoded with instructions that, when executed, cause a programmable processor to perform any of the techniques of this disclosure.

The details of one or more examples are set forth in the accompanying drawings and the description below. Other features, objects, and advantages will be apparent from the description, drawings, and claims.

DETAILED DESCRIPTION

Template matching (TM) may be used to refine an advanced motion vector predictor (AMVP) candidate after an AMVP candidate list is constructed. However, in some example systems, the AMVP candidates are derived or determined from spatial neighbor blocks, collocated, bottom-right temporal blocks, or history-based motion information which is acquired from recently decoded prediction units (PUs). Therefore, it may be highly likely that all these potential AMVP candidates contain very similar motion information, which may be detrimental to the diversity of the AMVP candidate list. Furthermore, in some examples systems, the AMVP candidate list contains a maximum of two candidates. Therefore, the ability to include diverse AMVP candidates is further reduced or restricted.

Techniques are described herein for construction of an AMVP candidate list and AMVP index signaling which may improve the diversity of candidates in the AMVP candidate list and may result in more efficient coding. For example, a video coder (e.g., encoder or decoder) may construct an AMVP candidate list that includes one or more non-adjacent candidates. The one or more non-adjacent candidates may be located in the AMVP candidate list after any temporal candidates and/or before any history-based candidates. In some examples, the length of the AMVP candidate list may be greater than two candidates, such as being five candidates long. By including one or more non-adjacent candidates in the AMVP candidate list, the diversity of motion information of the candidates in the AMVP candidate list may be increased, which may result in more efficient coding.

Figure 1:
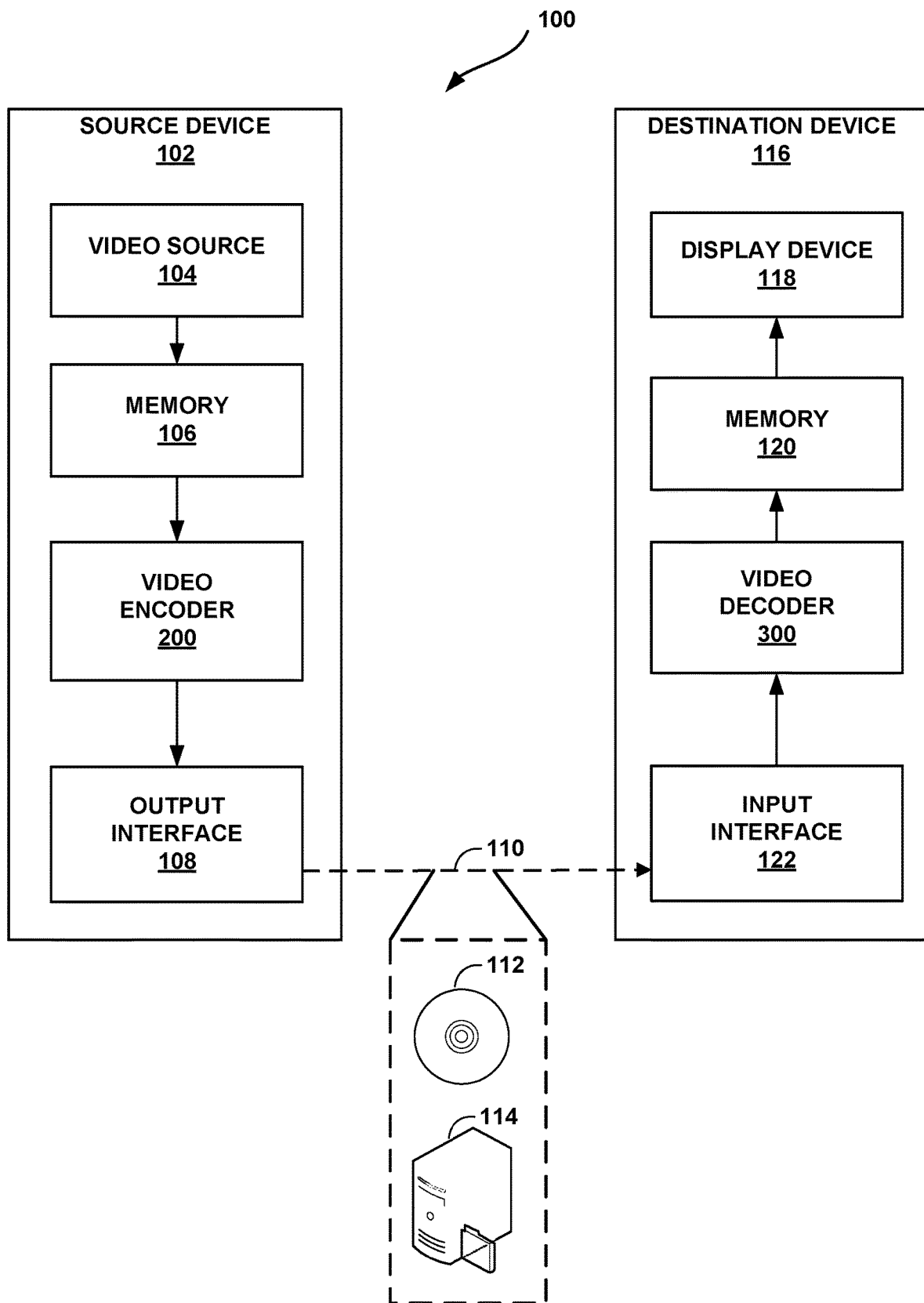
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for construction of an AMVP candidate list and AMVP index signaling. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for construction of an AMVP candidate list and AMVP index signaling. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally, or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both, that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 20th Meeting: by teleconference, 7-16 Oct. 2020, JVET-T2001-v1 (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, or coding block e.g., in terms of differences between the CU or coding block and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using AMVP or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method includes determining at least one of a temporal candidate or a history-based candidate; determining at least one non-adjacent candidate from at least one non-adjacent candidate unit, wherein the at least one non-adjacent candidate is not adjacent to a current prediction unit (PU); determining an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and coding the current PU based on the AMVP candidate list.

In accordance with the techniques of this disclosure, a device includes memory configured to store the video data; and one or more processors implemented in circuitry and communicatively coupled to the memory, the one or more processors being configured to: determine at least one of a temporal candidate or a history-based candidate; determine at least one non-adjacent candidate from at least one non-adjacent candidate unit, wherein the at least one non-adjacent candidate unit is not adjacent to a current prediction unit (PU); determine an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and code the current PU based on the AMVP candidate list.

In accordance with the techniques of this disclosure, a non-transitory computer-readable storage medium stores instructions that, when executed, cause one or more processors to: determine at least one of a temporal candidate or a history-based candidate; determine at least one non-adjacent candidate from at least one non-adjacent candidate unit, wherein the at least one non-adjacent candidate unit is not adjacent to a current prediction unit (PU); determine an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and code the current PU based on the AMVP candidate list.

In accordance with the techniques of this disclosure, a device includes means for determining at least one of a temporal candidate or a history-based candidate; means for determining at least one non-adjacent candidate from at least one non-adjacent candidate unit, wherein the at least one non-adjacent candidate unit is not adjacent to a current prediction unit (PU); means for determining an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and means for coding the current PU based on the AMVP candidate list.

In accordance with the techniques of this disclosure, a method includes determining an AMVP candidate list, wherein at least one candidate in the AMVP candidate list is derived from a non-adjacent candidate unit, and wherein the non-adjacent candidate unit is not adjacent to a current PU; and coding the current PU based on the AMVP candidate list.

In accordance with the techniques of this disclosure, a device includes memory configured to store video data and one or more processors implemented in circuitry and communicatively coupled to the memory, the one or more processors being configured to perform any of the techniques of this disclosure.

In accordance with the techniques of this disclosure, a device includes at least one means for performing any of the techniques of this disclosure.

In accordance with the techniques of this disclosure, a computer-readable storage medium is encoded with instructions that, when executed, cause a programmable processor to perform any of the techniques of this disclosure.

This disclosure may generally refer to "signaling" or "parsing" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116. The term "parsing" refers to determining the value of a signaled syntax element and/or other data. For example, video decoder 300 may parse a signaled syntax element to determine the value of the signaled syntax element.

Figure 2A:
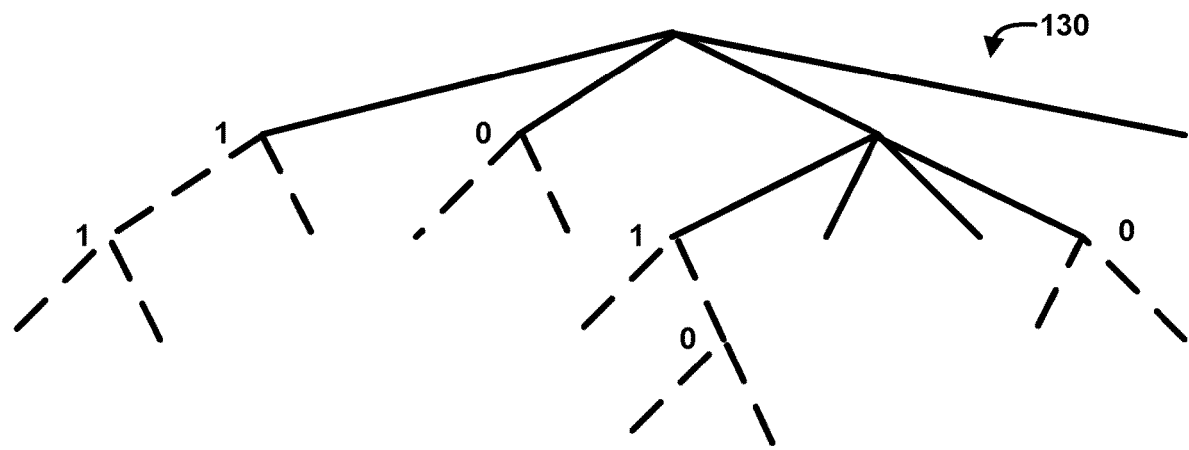
FIGS. 2A and 2B are conceptual diagrams illustrating an example quadtree binary tree (QTBT) structure, and a corresponding coding tree unit (CTU).
Figure 2B:
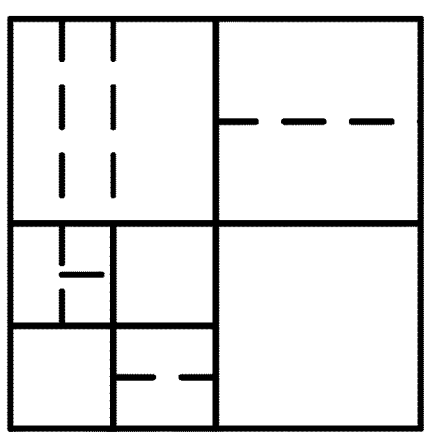

FIGS. 2A and 2B are conceptual diagrams illustrating an example QTBT structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
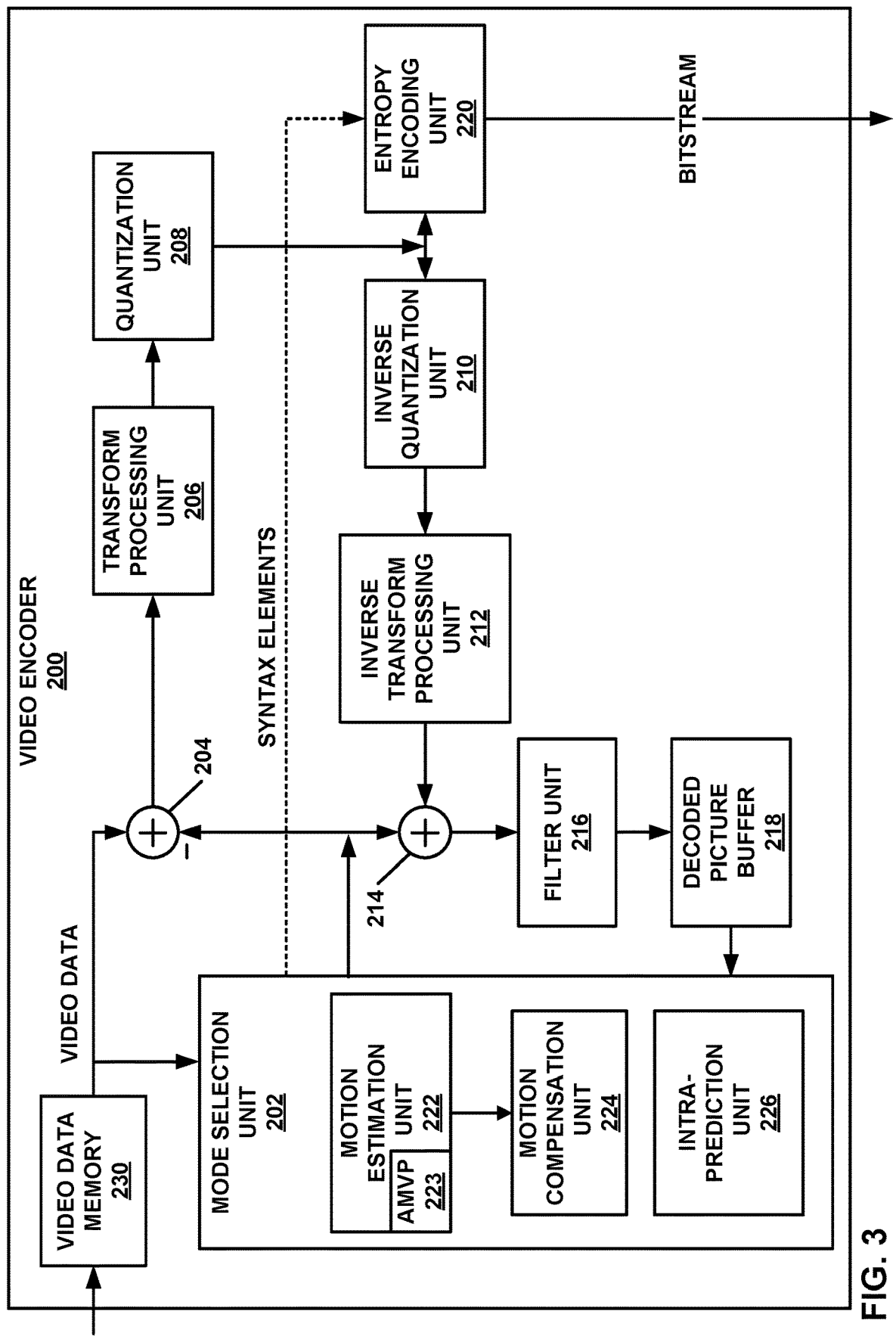
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266), and HEVC (ITU-T H.265). However, the techniques of this disclosure may be performed by video encoding devices that are configured to other video coding standards or proprietary coding techniques.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block. In some examples, motion estimation unit 222 may include AMVP unit 223 which may determine at least one of a temporal candidate or a history-based candidate. AMVP unit 223 may also determine at least one non-adjacent candidate from at least one non-adjacent candidate unit, wherein the at least one non-adjacent candidate unit is not adjacent to a current PU. AMVP unit 223 may determine an AMVP candidate list including the at least one of the temporal candidate or the history-based candidate and the at least one non-adjacent candidate. AMVP unit 223 may add the at least one non-adjacent candidate to the AMVP candidate list after the temporal candidate and/or before the history-based candidate.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. The prediction block may be a block of prediction sample(s) and may also be referred to as a PU. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block, e.g. the block of prediction sample(s), to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead may generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine at least one of a temporal candidate or a history-based candidate; determine at least one non-adjacent candidate from at least one non-adjacent candidate unit, wherein the at least one non-adjacent candidate unit is not adjacent to a current prediction unit (PU); determine an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and code the current PU based on the AMVP candidate list.

Video encoder 200 also represents an example of a device configured to encode video data including a memory configured to store video data, and one or more processing units implemented in circuitry and configured to determine an AMVP candidate list, wherein at least one candidate in the AMVP candidate list is derived from a non-adjacent candidate unit, and wherein the at least one non-adjacent candidate unit is not adjacent to a current PU; and encode the current PU based on the AMVP candidate list. In some examples, the at least one non-adjacent candidate is after any temporal candidate(s) and/or before any history-based candidate(s).

Figure 4:
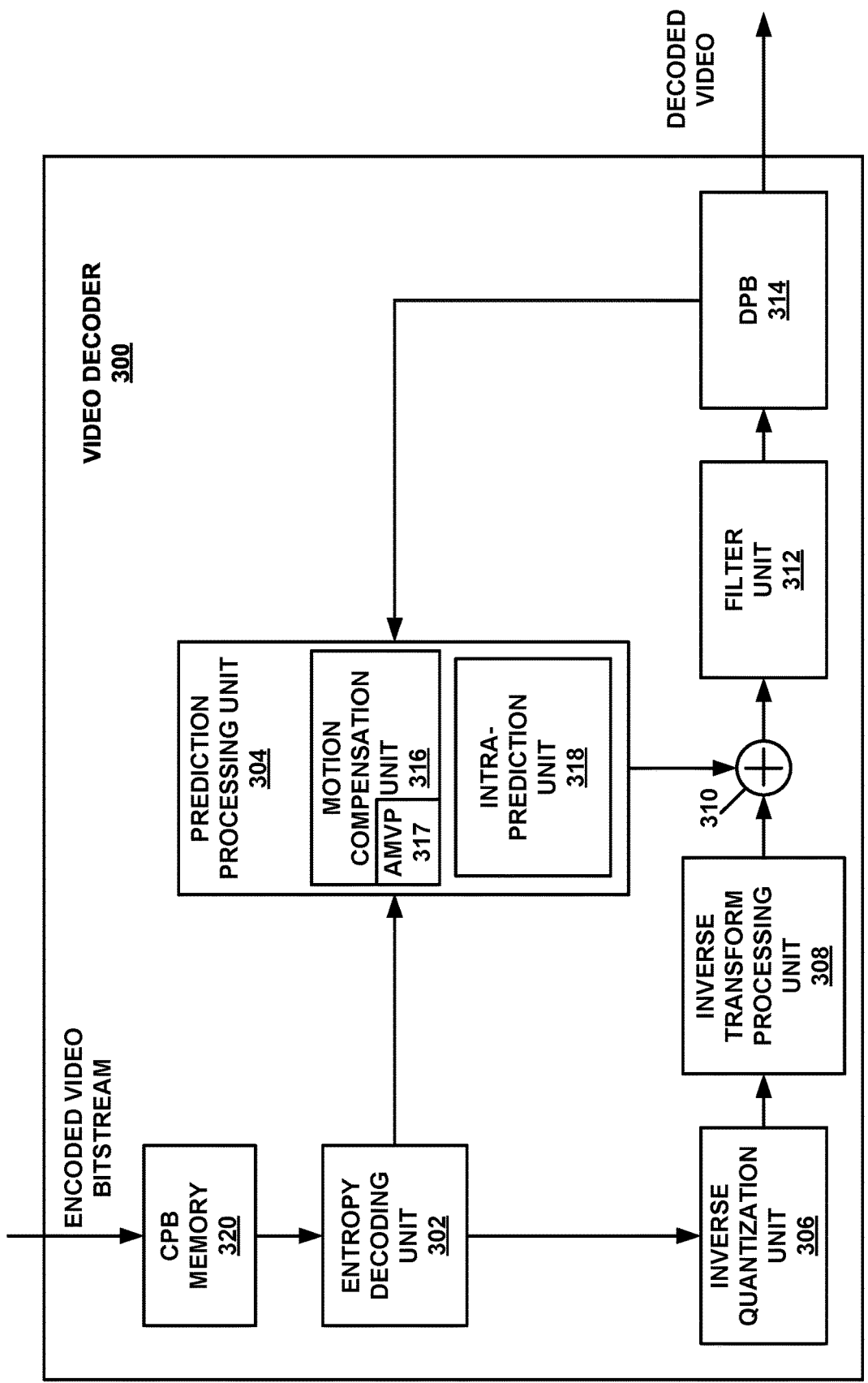
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266), and HEVC (ITU-T H.265). However, the techniques of this disclosure may be performed by video coding devices that are configured to operate according to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally, or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3). In some examples, motion compensation unit 316 may include AMVP unit 317 which may determine at least one of a temporal candidate or a history-based candidate. AMVP unit 317 may also determine at least one non-adjacent candidate from at least one non-adjacent candidate unit, wherein the at least one non-adjacent candidate unit is not adjacent to a current PU. AMVP unit 317 may determine an AMVP candidate list including the at least one of the temporal candidate or the history-based candidate and the at least one non-adjacent candidate. AMVP unit 317 may add the at least one non-adjacent candidate to the AMVP candidate list after the temporal candidate and/or before the history-based candidate.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured determine at least one of a temporal candidate or a history-based candidate; determine at least one non-adjacent candidate from at least one non-adjacent candidate unit, wherein the at least one non-adjacent candidate unit is not adjacent to a current prediction unit (PU); determine an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and code the current PU based on the AMVP candidate list.

Video decoder 300 also represents an example of a video decoding device including a memory configured to store video data, and one or more processing units implemented in circuitry and configured to determine an AMVP candidate list, wherein at least one candidate in the AMVP candidate list is derived from a non-adjacent candidate unit, and wherein the non-adjacent candidate unit is not adjacent to a current PU; and decode the current PU based on the AMVP candidate list.

In this section, HEVC, JEM and VVC Draft 10 techniques are discussed. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a video coding standard, namely HEVC or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

ITU-T VCEG (Q6/16) and ISO/IEC MPEG (JTC 1/SC 29/WG 11) studied the potential need for standardization of future video coding technology with a compression capability that significantly exceeds that of the current HEVC standard (including its current extensions and near-term extensions for screen content coding and high-dynamic-range coding). The groups worked together on this exploration activity in a joint collaboration effort known as the Joint Video Exploration Team (JVET) to evaluate compression technology designs proposed by their experts in this area. A version of reference software, i.e., VVC Test Model 10 (VTM 10.0) can be downloaded from: https://vcgit.hhi-.fraunhofer.de/jvet/VVCSoftware_VTM The Versatile Video Coding (VVC) draft specification can be referred to as JVET-T2001 or VVC, Draft 10. An algorithm description of Versatile Video Coding and Test Model 10 (VTM 10.0) can be referred to as JVET-T2002.

CU Structure and Motion Vector Prediction in VVC Draft 10 is now discussed. In VVC Draft 10, the largest coding unit in a slice is called a CTB or CTU. A CTB contains a quad-tree, binary-tree or ternary-tree, the nodes of which are CUs.

The size of a CTB can range from 4×4 to 128×128 in the VVC main profile. A CU may range in size from the same size of a CTB to as small as 4×4. Each CU may be coded with one mode, e.g., inter or intra. When a CU is inter-coded, the CU may be further partitioned into 2, 3 or 4 PUs or be just one PU when further partitioning does not apply. For example, video encoder 200 or video decoder 300 may partition CUs into PUs. When two PUs are present in one CU, they are evenly divided to be half size rectangles. When three PUs are present in one CU, three rectangles of ¼, ½ and ¼ size of the CU are used.

When the CU is inter-coded, each PU has one set of motion information, which is derived with a unique inter prediction mode.

Motion vector prediction in VVC Draft 10 is now discussed. In VVC Draft 10, there are two inter prediction modes, named merge mode (skip mode is considered as a special case of merge mode) and AMVP mode for a PU. In AMVP mode, an MV candidate list is maintained for multiple motion vector predictors. The MV(s), as well as reference indices in AMVP mode, of the current PU are generated by taking one candidate from the MV candidate list.

In VVC Draft 10, the MV candidate list contains up to two candidates for the AMVP mode. Under the AMVP mode, for each potential prediction direction from either list 0 or list 1, a reference index is explicitly signaled, together with an MV predictor (MVP) index to the MV candidate list since the AMVP candidate contains only a motion vector. For example, video encoder 200 may explicitly signal a reference index. In AMVP mode, the predicted motion vectors may be further refined.

The candidates for the AMVP mode may be derived or determined from spatial neighboring bocks, temporal neighboring blocks or a history-based motion information table. For example, video encoder 200 or video decoder 300 may derive or determine the candidates for the AMVP mode.

Figure 5:
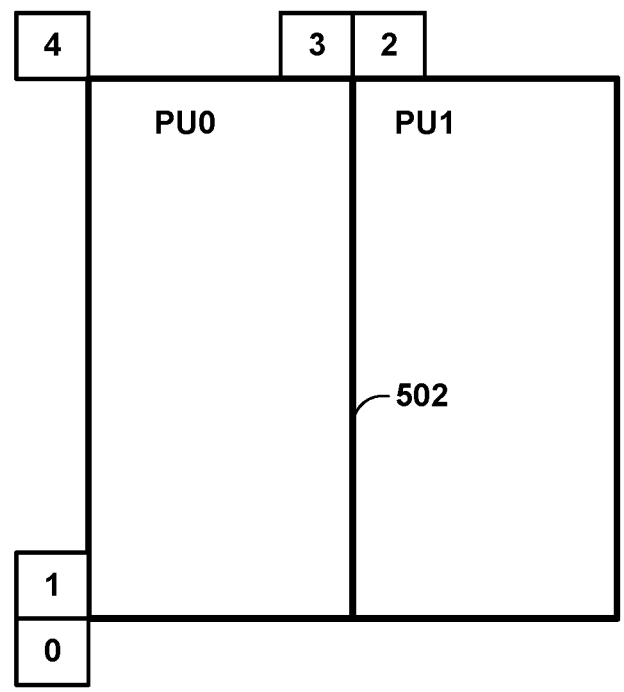
FIG. 5 is a conceptual diagram illustrating example spatial neighboring motion vector candidates for advanced motion vector predictor (AMVP) mode.

Spatial neighboring motion vector candidates in VVC Draft 10 are now discussed. FIG. 5 is a conceptual diagram illustrating example spatial neighboring motion vector candidates for AMVP mode. Spatial neighboring MV candidates are derived or determined from the neighboring blocks shown on FIG. 5.

In AVMP mode, the neighboring blocks are divided into two groups: a left group consisting of the blocks 0 and 1, and an above group consisting of the blocks 2, 3, and 4 as shown in FIG. 5. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate. Thus, the temporal distance differences from the reference picture can be compensated.

Temporal motion vector prediction in VVC is now discussed. A temporal motion vector predictor (TMVP) candidate, if enabled and available, is added into the MV candidate list after spatial motion vector candidates. For example, video encoder 200 or video decoder 300 may add the TMVP into the MV candidate list after spatial motion vector candidates.

Figures 6A, 6B:
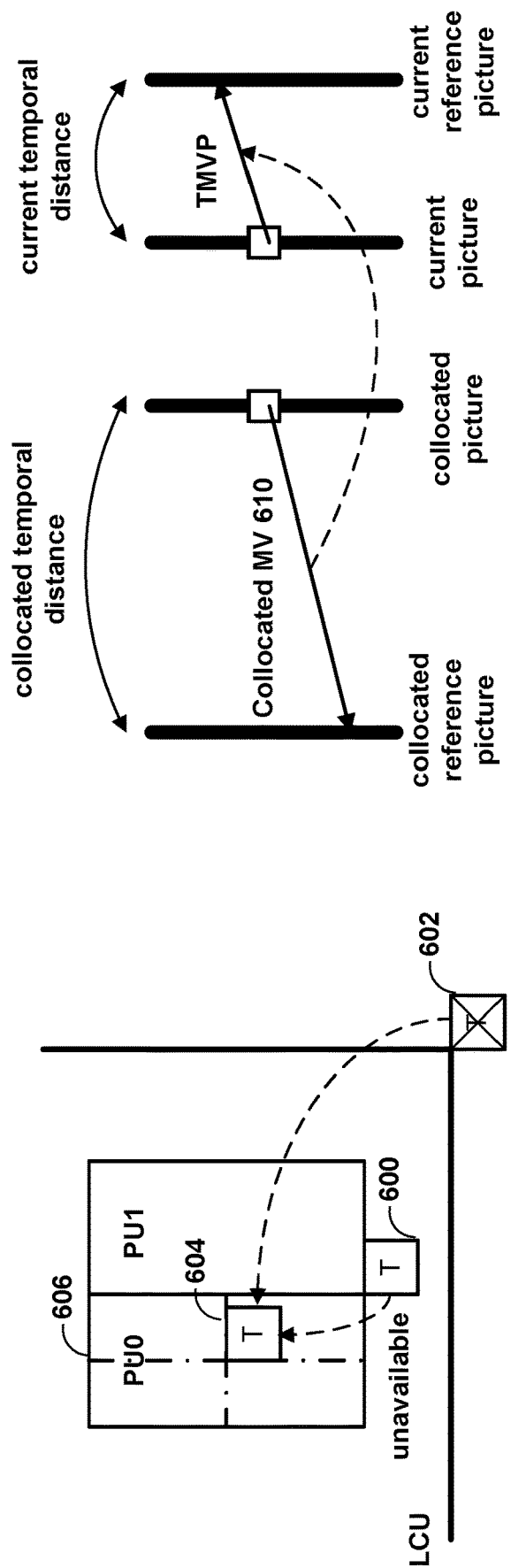
FIGS. 6A and 6B are conceptual diagrams illustrating an example temporal motion vector predictor candidate and motion vector scaling, respectively.

FIGS. 6A-6B are conceptual diagrams illustrating an example temporal motion vector predictor candidate and motion vector scaling, respectively. The primary block location for TMVP candidate derivation is the bottom right block outside of the collocated PU shown in FIG. 6A as a block "T" 600, to compensate the bias to the above and left blocks used to generate spatial neighboring candidates. However, if that block is located outside of the current CTB row (shown as block 602) or motion information is not available, the block is substituted with a center block 604 of the PU0 606.

A motion vector for a TMVP candidate is derived or determined from the collocated PU of the collocated picture, indicated in the slice level. The motion vector for the collocated PU is called a collocated motion vector.

Similar to temporal direct mode in AVC, to derive or determine the TMVP candidate motion vector, collocated motion vector 610 needs to be scaled to compensate the temporal distance differences, as shown in FIG. 6B. For example, video decoder 300 may scale collocated motion vector 610 to compensate for temporal distance differences.

History-based motion vector prediction (HMVP) in VVC Draft 10 is now discussed. An HMVP candidate is defined as the motion information of a previously coded block. A history table with multiple HMVP candidates may be maintained during the encoding/decoding process. For example, video encoder 200 or video decoder 300 may maintain a table with multiple HMVP candidates. Whenever there is an inter-coded non-affine block, the associated motion information may be added to the last entry of the history table as a new HMVP candidate.

Figure 7:
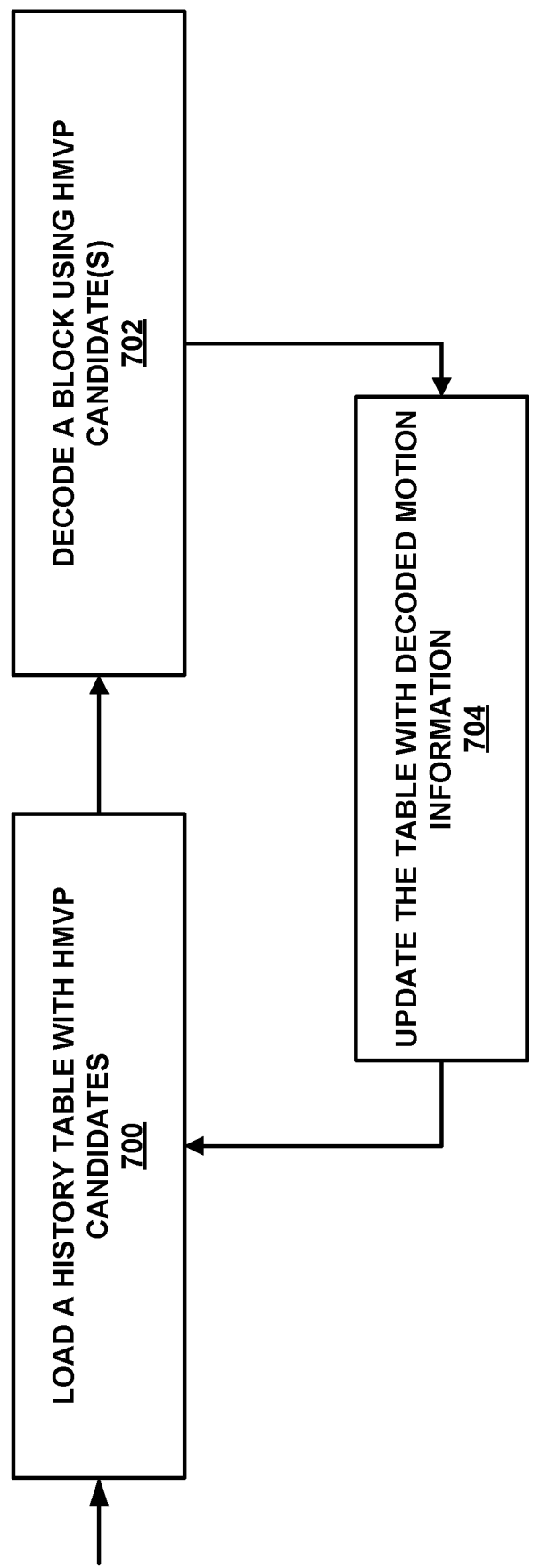
FIG. 7 is a conceptual diagram illustrating an example decoding flow chart for history-based motion vector prediction.

FIG. 7 is a conceptual diagram illustrating an example decoding flow chart for history-based motion vector prediction. For example, video decoder 300 may load a history table with HMVP candidates (700). Video decoder 300 may decode a block using one or more of the HMVP candidates (702). Video decoder 300 may then update the table with decoded motion information (704). For example, video decoder 300 may add the motion information for an inter-coded non-affine block to the history table. For example, when the HMVP candidate table is fully occupied, video decoder 300 may apply the FIFO (First In First Out) rule to exclude the oldest candidate in the history table and add the most recent decoded inter CU motion information to the history table as the last entry in the history table. The motion vectors of the last 4 HMVP candidates in the table are inserted in the AMVP candidate list after the TMVP candidate. Only HMVP candidates with the same reference picture as the AMVP target reference picture are used to construct the AMVP candidate list. Pruning may be applied on the HMVP candidates. For example, video decoder 300 may prune the HMVP candidates.

Other aspects of motion prediction in HEVC are now discussed. Several aspects of AMVP modes are mentioned as follows.

Motion vector scaling: the value of motion vectors may be proportional to the distance between pictures in presentation/display time. A motion vector associates two pictures, the reference picture, and the picture containing the motion vector (namely, the containing picture). When a motion vector is utilized to predict another motion vector, the distance between the containing picture and the reference picture is calculated based on the Picture Order Count (POC) values.

For a motion vector to be predicted, in some examples, both the motion vector's associated containing picture and reference picture may be different than for the motion vector of the predictor. Therefore, video encoder 200 or video decoder 300 may calculate a new distance (based on POC). Video encoder 200 or video decoder 300 may scale the motion vector based on these two POC distances. For a spatial neighboring candidate, the containing pictures for the two motion vectors are the same, while the reference pictures may be different. In VVC Draft 10, motion vector scaling applies to temporal neighboring candidates when constructing the AMVP list.

Artificial motion vector candidate generation: If a motion vector candidate list is not complete, video encoder 200 or video decoder 300 may generate artificial motion vector candidates and insert the artificial motion vector candidates at the end of the AMVP list until the AMVP list has all the candidates (e.g., the list is full). In AMVP mode, zero candidates are used to fill up any remaining slots in the AMVP list. For example, if there are remaining slots in the AMVP list, video encoder 200 or video decoder 300 may use zero candidates to fill up the remaining slots in the AMVP list.

Pruning process for candidate insertion: Candidates from different blocks may happen to be the same, which decreases the efficiency of the AMVP candidate list. Therefore, video encoder 200 or video decoder 300 may apply a pruning process to address this problem. During the pruning process, video encoder 200 or video decoder 300 may compare one candidate against the other candidate in the current candidate list (e.g., the AMVP candidate list) to avoid inserting identical candidates in the current candidate list to a certain extent.

Template matching (TM) prediction is now discussed. TM prediction is a special merge mode based on Frame-Rate Up Conversion (FRUC) techniques. With this mode, motion information of a block is not signaled, but is derived or determined at decoder side. For example, video encoder 200 may not signal motion information with TM prediction and video decoder 300 may derive or determine the motion information. TM prediction may be applied to both AMVP mode and regular merge mode. In AMVP mode, motion vector predictor (MVP) candidate selection may be determined based on template matching so as to select the template that has the minimal difference between a current block template and a reference block template. In regular merge mode, video encoder 200 may signal a TM mode flag to indicate the use of TM mode and video decoder 300 may apply TM mode to the merge candidate indicated by merge index for MV refinement.

Figure 8:
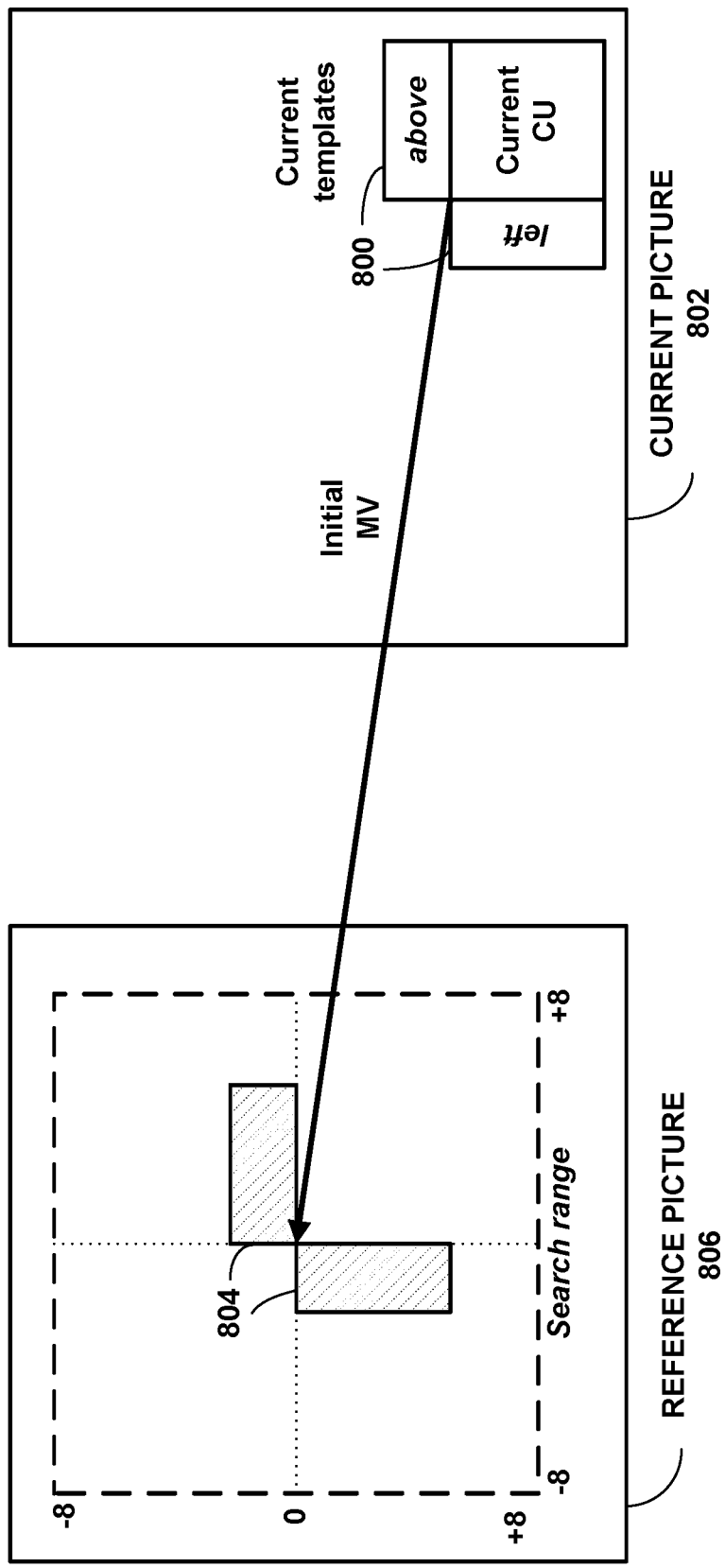
FIG. 8. is a conceptual diagram illustrating template matching performed on a search area around an initial motion vector.

FIG. 8. is a conceptual diagram illustrating TM performed on a search area around an initial motion vector. As shown in FIG. 8, TM techniques may be used to derive or determine motion information of the current PU. Deriving motion information may include finding the closest match between template 800 (in above and/or left neighboring blocks of the current PU) in current picture 802 and a block 804 (e.g., the same size as template 800) in reference picture 806. With an AMVP candidate selected based on initial matching error, the candidate's MVP is refined by template matching. With a merge candidate indicated by a signaled merge index, the candidate's merged MVs corresponding to reference picture list0 (L0) and reference picture list1 (L1) are refined independently by TM and then the less accurate MV is further refined again with the more accurate MV as a prior reference. For example, video decoder 300 may receive and parse the signaled merge index and apply template matching to the merged MVs to refine the MVs.

Cost function: When a motion vector points to a fractional sample position, video decoder 300 may use motion compensated interpolation. To reduce complexity, bi-linear interpolation is used instead of regular 8-tap discrete cosine transform-interpolation filter (DCT-IF) interpolation for both TM and to generate templates on reference pictures. The matching cost C of template matching may be calculated as follows:

$$C = SAD + w \cdot (|MV_x - MV_x^s| + |MV_y - MV_y^s|)$$

where w is a weighting factor which is empirically set to 4, MV and $MV^s$ indicate the currently testing MV and the initial MV (e.g., an MVP candidate in AMVP mode or merged motion vector in merge mode), respectively. Sum of absolute differences (SAD) may be used as the matching cost of template matching.

When TM is used, motion may be refined by using luma samples only. The derived or determined motion may be used for both luma and chroma for motion compensation (MC) inter prediction. After the MV is decided, final MC is performed using 8-taps interpolation filter for luma and 4-taps interpolation filter for chroma. For example, video decoder 300 may refine motion using only luma samples.

Search method: MV refinement may be a pattern-based MV search with the criterion of TM cost. Two search patterns may be supported—a diamond pattern search and a cross pattern search for MV refinement. For example, video decoder 300 may use a diamond pattern search or a cross pattern search for MV refinement. The MV may be directly searched at quarter luma sample motion vector difference (MVD) accuracy with a diamond pattern, followed by quarter luma sample MVD accuracy with a cross pattern, and then the quarter luma sample MVD accuracy cross pattern search may be followed by one-eighth luma sample MVD refinement with cross pattern. The search range of MV refinement may be set equal to (−8, +8) luma samples around the initial MV.

Video encoder 200 or video decoder 300 may apply the TM technique to refine the AMVP candidate after the AMVP candidate list is constructed. In this case, video encoder 200 may skip the AMVP index signaling since the AMVP candidate with the minimum TM cost will be used as the starting point for the TM-based refinement and the final refined MV will be used as the final MVP. However, the AMVP candidates are derived or determined from spatial neighbor blocks, collocated or bottom-right temporal blocks, or history-based motion information which is acquired from recently decoded PUs. Therefore, it may be highly likely that all these potential AMVP candidates contain very similar motion information, which is detrimental to the diversity of the AMVP candidate list. Furthermore, the AMVP candidate list contains a maximum of 2 candidates. Therefore, the chance to include diverse AMVP candidates is further reduced.

Even though with TM-based refinement applied to AMVP candidates, the signaling overhead of an AMVP index may be saved, video encoder 200 or video decoder 300 always using the AMVP candidate that has the minimal TM cost as the starting point for MV refinement may not be the best choice. For example, using the AMVP candidate that has the minimal TM cost may result in a local minimum TM cost; however this may not always be a good global choice. Plus, the TM cost does not always correctly represent the difference between the current block and the reference block.

Non-adjacent AMVP candidates are now discussed. This disclosure describes a category of motion information that may be added to an AMVP candidate list, which is one or more non-adjacent AMVP candidates, e.g., motion vector candidates derived or determined from blocks or units which are not adjacent to the current PU. All the existing categories of candidates for AMVP are located nearby the current PU (e.g., derived or determined from blocks nearby the current PU), and are very likely to provide similar motion information. With the introduction of the non-adjacent AMVP candidate(s), the diversity of the AMVP candidate list may be improved. This introduction of a non-adjacent AMVP candidate(s) may enable video encoder 200 or video decoder 300, applying the TM-based refinement process, to have a higher chance to find a better final motion vector predictor. In some examples, non-adjacent AMVP candidates may be used in either intra mode (e.g., in which case they may be spatially non-adjacent to the current PU) or in inter mode (e.g., in which case they may be spatially non-adjacent to a collocated PU in another picture).

Figure 9:
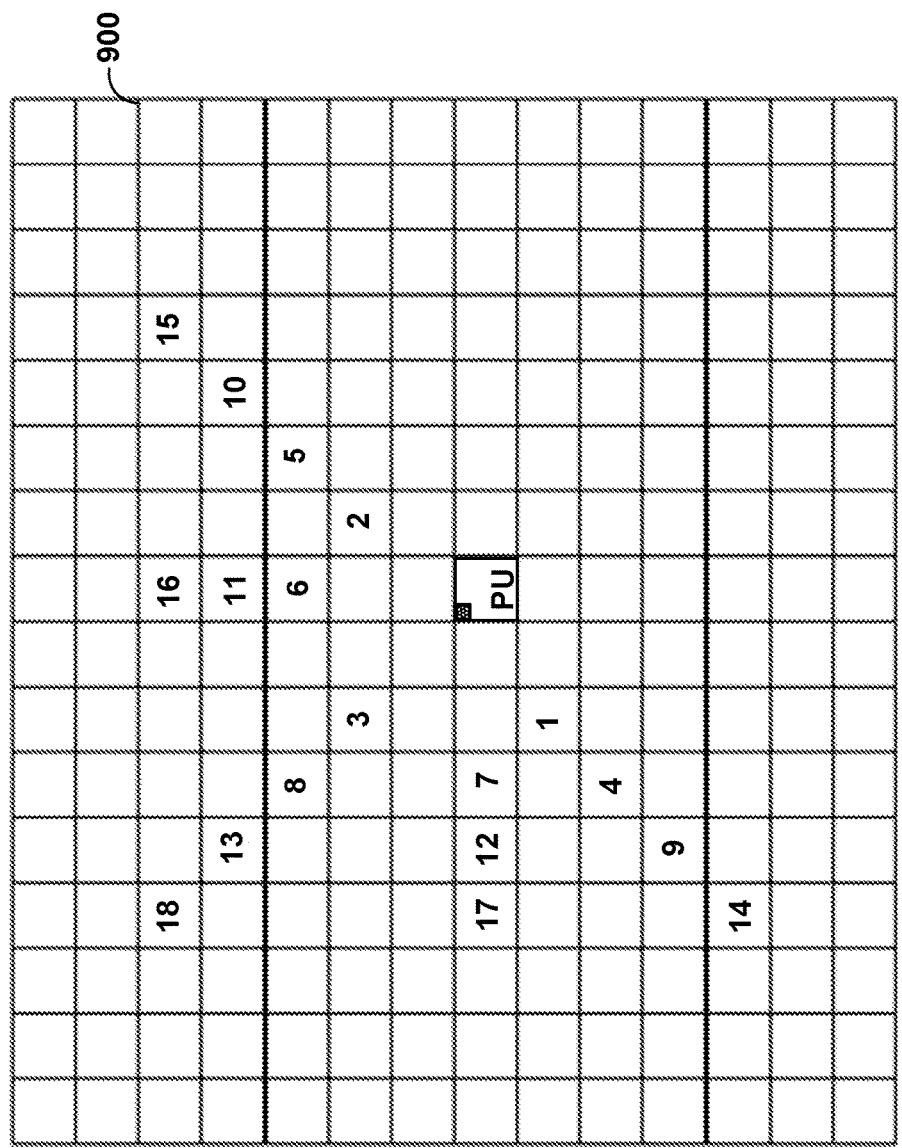
FIG. 9 is a conceptual diagram illustrating non-adjacent AMVP candidate unit locations.

FIG. 9 is a conceptual diagram illustrating example non-adjacent AMVP candidate locations, e.g., relative locations of blocks or units with regard to the current PU from which the non-adjacent AMVP candidate(s) are derived or determined. The pattern and location of the example non-adjacent candidate units is shown in FIG. 9. In the example of FIG. 9, each small square in grid 900 represents one 4×4 unit or block, with a width of 4 luma samples and a height of 4 luma samples. The current PU is labeled PU. A top-left luma sample of the current PU is shown in a pattern-filled box in the current PU. The locations of eighteen potential non-adjacent candidate units are shown as numbered 1-18. For example, video encoder 200 or video decoder 300 may select the at least one non-adjacent candidate unit from a group of potential non-adjacent candidate units consisting of units/blocks located one unit (block) below and two units (blocks) to the left of the current PU (labeled 1), two units (blocks) above and one unit (block) to the right of the current PU (labeled 2), two units (blocks) above and two units (blocks) to the left of the current PU (labeled 3), two units (blocks) below and three units (blocks) to the left of the current PU (labeled 4), three units (blocks) above and two units (blocks) to the right of the current PU (labeled 5), three units (blocks) above the current PU (labeled 6), three units (blocks) to the left of the current PU (labeled 7), three units (blocks) above and three units (blocks) to the left of the current PU (labeled 8), three units (blocks) below and four units (blocks) to the left of the current PU (labeled 9), four units (blocks) above and three units (blocks) to the right of the current PU (labeled 10), four units (blocks) above the current PU (labeled 11), four units (blocks) to the left of the current PU (labeled 12), four units (blocks) above and four units (blocks) to the left of the current PU (labeled 13), four units (blocks) below and five units (blocks) to the left of the current PU (labeled 14), five units (blocks) above and four units (blocks) to the right of the current PU (labeled 15), five units (blocks) above the current PU (labeled 16), five units (blocks) to the left of the current PU (labeled 17), and five units (blocks) above and five units (blocks) to the left of the current PU (labeled 18). Simulations have shown that using units/blocks at these locations as AMVP candidate units may improve coding efficiency with a slight increase in complexity for some classes of video. The simulation results follow:

|  | Over ECM | | | | |
| --- | --- | --- | --- | --- | --- |
|  | Y | U | V | EncT | DecT |
| Class A1 | −0.06% | −0.26% | −0.16% | 100% | 100% |
| Class A2 | −0.09% | −0.28% | −0.15% | 101% | 100% |
| Class B | −0.06% | −0.04% | −0.09% | 102% | 101% |
| Class C | −0.06% | −0.13% | −0.24% | 102% | 101% |
| Class E |  |  |  |  |  |
| Overall | −0.07% | −0.16% | −0.16% | 101% | 101% |
| Class D | −0.01% | −0.08% | 0.09% | 102% | 102% | where ECM is an enhanced compression model, Y is luma, U is blue projection chroma, V is red projection chroma, EncT is encoding time, and DecT is decoding time. The negative percentages for Y, U, and V indicate the improved efficiency. Class A1 and A2 video have a resolution of 3840×2160 (width and height in pixels), class B video has a resolution of 1920×1080, class C video has a resolution of 832×480, and class D video has a resolution of 416×240. Class D video is not included in the overall results listed above. The reason class D video did not perform as well as the other classes in the simulation is that the resolution is so low that the image boundary is relatively close to the current PU position. As such, the number of available non-adjacent units that may be used to derive motion information is relatively less than in higher resolution video. Additionally, the image content in class D video changes relatively quickly due to low resolution. Therefore, a non-adjacent unit may be irrelevant to the current PU's image content and even if there is available motion information for the non-adjacent unit, it may be less likely to be useful. The performance of the techniques of this disclosure was not simulated using class E video.

Video encoder 200 or video decoder 300 may derive or determine the at least one non-adjacent PU/block location based on the current PU size. For example, video encoder 200 or video decoder 300 may determine a size of the current PU and determine the at least one non-adjacent candidate based at least in part on the size of the current PU. For example, a distance level may be used to control how far away the at least one non-adjacent PU/block is located with respect to the current PU. A level index may also be used as the group indices for each of the non-adjacent candidate groups. A total of four groups may be defined as follows:

Group 1: {1, 2, 3} (e.g., the locations numbered 1-3)
Group 2: {4, 5, 6, 7, 8} (e.g., the locations numbered 4-8)
Group 3: {9, 10, 11, 12, 13} (e.g., the locations numbered 9-13)
Group 4: {14, 15, 16, 17, 18} (e.g., the locations numbered 14-18)

For example, the potential non-adjacent candidate units may be divided into four groups: 1) a first group of potential non-adjacent candidate units located one unit (block) below and two units (blocks) to the left of the current PU, two units (blocks) above and one unit (block) to the right of the current PU, and two units (blocks) above and two units (blocks) to the left of the current PU; 2) a second group of potential non-adjacent candidate units located two units (blocks) below and three units (blocks) to the left of the current PU, three units (blocks) above and two units (blocks) to the right of the current PU, three units (blocks) above the current PU, three units (blocks) to the left of the current PU, three units (blocks) above and three units (blocks) to the left of the current PU; 3) a third group of potential non-adjacent candidate units located three units (blocks) below and four units (blocks) to the left of the current PU, four units (blocks) above and three units (blocks) to the right of the current PU, four units (blocks) above the current PU, four units (blocks) to the left of the current PU, four units (blocks) above and four units (blocks) to the left of the current PU; and 4) a fourth group of potential non-adjacent candidate units located four units (blocks) below and five units (blocks) to the left of the current PU, five units (blocks) above and four units (blocks) to the right of the current PU, five units (blocks) above the current PU, five units (blocks) to the left of the current PU, five units (blocks) above and five units (blocks) to the left of the current PU.

In some examples, an index map array may be defined as: idxMap[4][5]={{0, 1, 2}, {0, 1, 2, 3, 4}, {0, 1, 2, 3, 4}, {0, 1, 2, 3, 4}}. Two variables may be used to decide the final index and idxMap[level_index][position_index] may be linked to formulae to compute the at least one non-adjacent candidate location. The variable level_index may be within the range of 0 to 3. For example, a level_index of 0 may indicate Group 1, a level_index of 1 may indicate Group 2, a level_index of 2 may indicate Group 3, and a level_index of 3 may indicate Group 4. The variable position_index may be within the range of 0 to 2 (e.g., indicating the location numbered 1, 2, or 3, respectively) when level_index is equal to 0, and within the range of 0 to 4 when level_index is equal to 1, 2 or 3 (e.g., indicating a specific location within Group 2, Group 3, or Group 4). For example, video encoder 200 or video decoder 300 may signal or parse a level index indicative of a group of the plurality of groups and signal or parse a position index indicative of one of the potential non-adjacent candidate units belonging to the group indicated by the level index.

In some examples, for each idxMap[level_index][position_index], the following formulae 0 to 4 may be used to derive or determine the at least one non-adjacent candidate unit location:

0: offsetX=−iNADistanceHor−1; offsetY=height+iNADistanceVer−1;
1: offsetX=width+iNADistanceHor−1; offsetY=−iNADistanceVer−1;
2: offsetX=width>>1; offsetY=−iNADistanceVer−1;
3: offsetX=−iNADistanceHor−1; offsetY=height>>1;
4: offsetX=−iNADistanceHor−1; offsetY=−iNADistanceVer−1;

where width is the current PU width in number of luma samples, height is the current PU height in number of luma samples, iNA represents the i-th non-adjacent unit/block, iNADistanceHor=width*(level_index+1) and iNADistanceVer=height*(level_index+1). and ">>" refers to a bitwise right shift, where n>>k is equivalent to n/(2^k). For example, video encoder 200 or video decoder 300 may select, in accordance with a first syntax element indicative of the level index (e.g., level_index), and a second syntax element, e.g., idxMap[level_index][position_index], one of offsetX=−iNADistanceHor−1 and offsetY=height+iNADistanceVer−1, offsetX=width+iNADistanceHor−1 and offsetY=−iNADistanceVer−1, offsetX=width>>1 and offsetY=−iNADistanceVer−1, offsetX=−iNADistanceHor−1 and offsetY=height>>1, or offsetX=−iNADistanceHor−1 and offsetY=−iNADistanceVer−1, to use to determine the horizontal offset and the vertical offset, wherein offsetX is the horizontal offset, offsetY is the vertical offset, width is a width of the current PU in a number of luma samples, height is a height of the current PU in a number of luma samples, and iNA represents the i-th non-adjacent candidate unit/block and iNADistanceHor=width*(the first syntax element+1) and iNADistanceVer=height*(the first syntax element+1). The sign "+" for X and Y in the formulae correspond to the rightward and downward directions, respectively, in FIG. 9. The formula 0 may correspond to the locations numbered 1, 4, 9 and 14. The formula 1 may correspond to the locations numbered 2, 5, 10 and 15. The formula 2 may correspond to the locations numbered 6, 11 and 16. The formula 3 may correspond to the locations numbered 7, 12 and 17. The formula 4 may correspond to the locations numbered 3, 8, 13 and 18.

Video encoder 200 or video decoder 300 may compute a final non-adjacent candidate unit location by adding the horizontal offset (offsetX) and the vertical offset (offsetY) to the top-left luma sample coordinate of the current PU. The motion information from the 4×4 unit/block that contains the derived or determined non-adjacent sample position may be used as the candidate to be added to the AMVP candidate list if the 4×4 unit/block is inter-coded.

From the above-mentioned derivation process, it can be seen that a total number of 18 non-adjacent positions may be used as potential candidate units for deriving or determining non-adjacent candidates in the AMVP candidate list. However, if the AMVP candidate list size is still kept at two, the chance for a non-adjacent candidate to be added to the AMVP candidate list may remain relatively low. To retain the traditional spatial, temporal and history candidates in the AMVP candidate list while still offering a chance for a non-adjacent candidate to be considered, the AMVP candidate list size may be increased. In one example, the AMVP candidate list size is increased to five.

The non-adjacent candidate(s) can also be added with a different priority. In one example, the non-adjacent candidate(s) are added after (e.g., with a lower priority) the temporal candidate and/or before (e.g., with a higher priority) history-based candidates. For example, the AMVP candidate list may include at least one of a temporal candidate or a history-based candidate and the at least one non-adjacent candidate. Video encoder 200 or video decoder 300 may add the at least one non-adjacent candidate to the AMVP candidate list at least one of after the temporal candidate or before the history-based candidate. In another example, the at least one non-adjacent candidate is added after history-based candidates and/or before zero candidates. In yet a third example, the at least one non-adjacent candidate is added after spatial candidates and/or before temporal candidates.

In one example, the priority of the at least one non-adjacent candidate is treated similar to spatial candidates, wherein, a candidate unit that is located to the left of the current PU has a higher priority compared to a candidate unit that is located above of the current PU. One example of the AMVP candidate list construction process is: 1) spatial left neighboring candidates, 2) spatial left non-adjacent candidates, 3) spatial above neighboring candidates, 4) spatial above non-adjacent candidates, 5) temporal candidates, 6) history candidates, 7) zero MV candidates. In some examples, in each of the seven steps of the aforementioned technique, only one candidate may be added to the AMVP candidate list. For example, video encoder 200 or video decoder 300 may add a maximum of one candidate to the AMVP candidate list for each respective step of the seven steps.

Signaling of the AMVP index with TM AMVP refinement is now discussed. In VVC Draft 10, the AMVP index is not signaled when TM is used to refine the AMVP candidate list. The AMVP candidate with the minimal TM cost may be used as the starting point for TM AMVP refinement, and the final refined MV may be used as the motion vector predictor. However, as previously mentioned, such a design may reduce the diversity in the AMVP candidate list used for the final AMVP candidate selection. This may lead to less accurate AMVP candidates when the template does not have a strong correlation with the current PU data samples. In order to keep the advantage of refining the AMVP candidate with TM, while increasing the potential diversity of the AMVP candidate list, a hybrid scheme may be introduced in the AMVP candidate list construction process. Compared to the VVC Draft 10 design, after the TM AMVP refinement process is finished, instead of always using the TM refined AMVP candidate as the MVP, video encoder 200 or video decoder 300 may not exclude the other AMVP candidate(s) that has (have) not been refined from the AMVP candidate list. In this example, video encoder 200 will still have the chance to pick a/the non-refined AMVP candidate as the final motion vector predictor. In order to achieve this, video encoder 200 may signal the AMVP index. In one example, when an AMVP index equal to 0 is signaled, the TM refined AMVP candidate may be used as the MVP, when an AMVP index equal to 1 is signaled (e.g., for an AMVP candidate list of size 2), the non-refined AMVP candidate may be used as the MVP instead. For example, video encoder 200 may signal an AMVP index of 0 or 1, and video decoder 300 may parse the AMVP index to determine whether to use the refined AMVP candidate or the non-refined AMVP candidate as the MVP (e.g., for an AMVP candidate list of size 2).

Determining a second AMVP candidate based on MV distance is now discussed. As in the previous paragraph, when the TM refined AMVP candidate MV cand0Mv(hor, ver) is derived or determined by applying TM refinement to the minimum TM cost AMVP candidate, the rest of the AMVP candidates may be further evaluated to determine a second AMVP candidate MV cand1Mv(hor, ver). In this example, video encoder 200 or video decoder 300 may determine the second AMVP candidate MV based on MV distance to the cand0Mv. The determined second AMVP candidate MV cand1Mv may have a greater MV distance to the cand0Mv compared to other AMVP candidates; therefore, the current block may have a very different predictor compared to the TM refined AMVP candidate cand0Mv.

Given an AMVP candidate MV candXMv(hor, ver), the MV distance to the cand0Mv can be defined as: candXMvDistance=((|candXMv(hor)−cand0Mv(hor)|+|candXMv(ver)−cand0Mv(ver)|)>>N), wherein N is a predetermined integer value to derive or determine a scaled MV distance.

In one example, a second AMVP candidate MV is determined to be candXMv which has maximum MV distance to the cand0Mv.

In another example, a second AMVP candidate is determined to be candXMv which has minimum TM cost to MV distance ratio. Given an AMVP candidate MV candXMv (hor, ver), which has TM cost tmCostX, the TM cost-MV distance ratio can be defined as: tmCostX/candXMvDistance.

Figure 10:
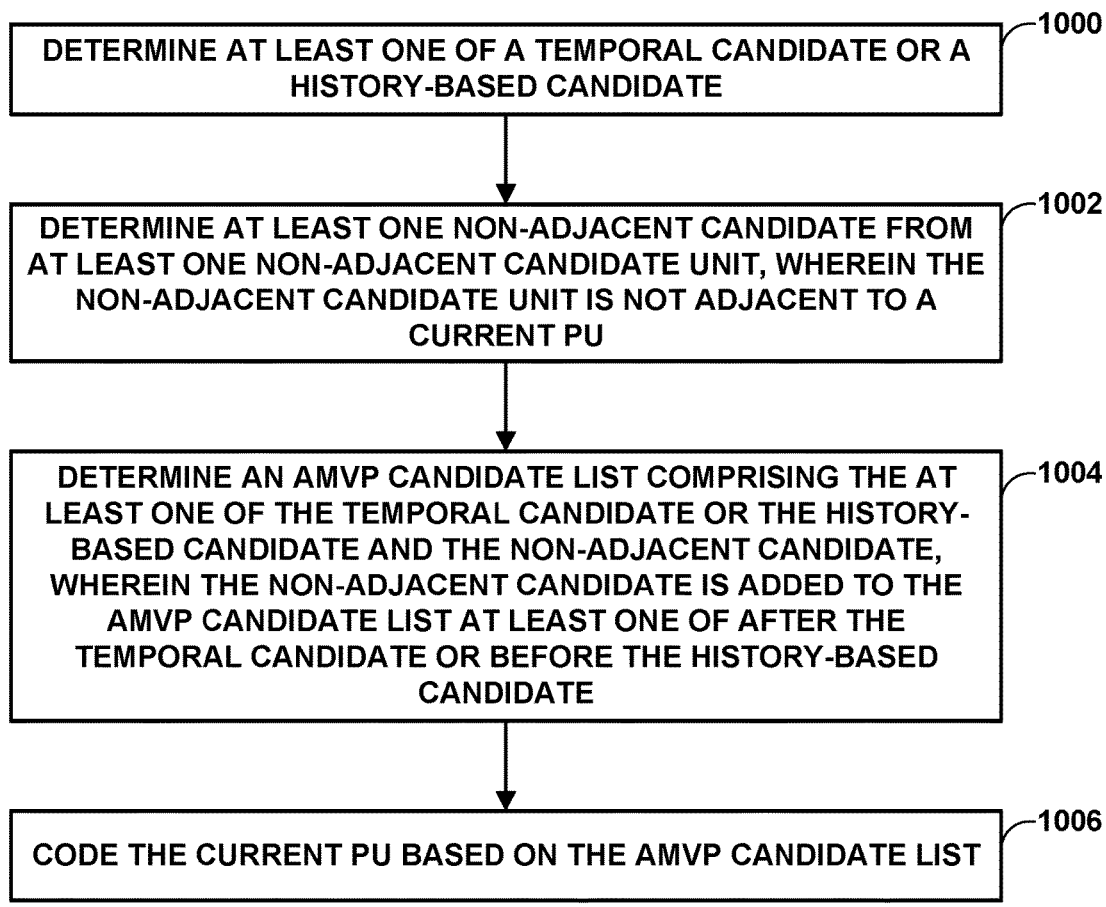
FIG. 10 is a flowchart illustrating example AMVP candidate list techniques according to one or more aspects of this disclosure.

FIG. 10 is a flowchart illustrating example AMVP candidate techniques according to one or more aspects of this disclosure. Video encoder 200 or video decoder 300 may determine at least one of a temporal candidate or a history-based candidate (1000). For example, video encoder 200 or video decoder 300 may determine a temporal candidate, a history-based candidate, or both a temporal candidate and a history-based candidate. Such candidates may be candidates for a motion vector predictor.

Video encoder 200 or video decoder 300 may determine at least one non-adjacent candidate from at least one non-adjacent candidate unit, wherein the at least one non-adjacent candidate unit is not adjacent to a current prediction unit (PU) (1002). For example, video encoder 200 or video decoder 300 may determine at least one non-adjacent candidate from at least one non-adjacent candidate unit at a location indicated by one of the numbers 1-18 in FIG. 9. The at least one non-adjacent candidate may be a candidate for a motion vector predictor.

Video encoder 200 or video decoder 300 may determine an AMVP candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate (1004). For example, video encoder 200 or video decoder 300 may construct an AMVP candidate list including the at least one non-adjacent candidate after the temporal candidate in the AMVP candidate list, before the history-based candidate in the AMVP candidate list, or after the temporal candidate and before the history-based candidate in the AMVP candidate list.

Video encoder 200 or video decoder 300 may code the current PU based on the AMVP candidate list (1006). For example, video encoder 200 or video decoder 300 may select a motion vector predictor from the AMVP candidate list and code the current PU using the selected motion vector predictor.

In some examples, determining the at least one non-adjacent candidate comprises selecting the at least one non-adjacent candidate unit from a group of potential non-adjacent candidate units consisting of units located one unit below and two units to the left of the current PU, two units above and one unit to the right of the current PU, two units above and two units to the left of the current PU, two units below and three units to the left of the current PU, three units above and two units to the right of the current PU, three units above the current PU, three units to the left of the current PU, three units above and three units to the left of the current PU, three units below and four units to the left of the current PU, four units above and three units to the right of the current PU, four units above the current PU, four units to the left of the current PU, four units above and four units to the left of the current PU, four units below and five units to the left of the current PU, five units above and four units to the right of the current PU, five units above the current PU, five units to the left of the current PU, and five units above and five units to the left of the current PU.

In some examples, a plurality of potential non-adjacent candidate units is divided into a plurality of groups. In some examples, video encoder 200 or video decoder 300 signals or parses a level index indicative of a group of the plurality of groups and signals or parses a position index indicative of one of the potential non-adjacent candidate units belonging to the group indicated by the level index, wherein the at least one non-adjacent candidate unit comprises the one of the potential non-adjacent candidate units.

In some examples, the plurality of groups includes: 1) a first group of potential non-adjacent candidate units located one unit below and two units to the left of the current PU, two units above and one unit to the right of the current PU, and two units above and two units to the left of the current PU; 2) a second group of potential non-adjacent candidate units located two units below and three units to the left of the current PU, three units above and two units to the right of the current PU, three units above the current PU, three units to the left of the current PU, three units above and three units to the left of the current PU; 3) a third group of potential non-adjacent candidate units located three units below and four units to the left of the current PU, four units above and three units to the right of the current PU, four units above the current PU, four units to the left of the current PU, four above units and four units to the left of the current PU; and 4) a fourth group of potential non-adjacent candidate units located four units below and five units to the left of the current PU, five units above and four units to the right of the current PU, five units above the current PU, five units to the left of the current PU, five units above and five units to the left of the current PU.

In some examples, video encoder 200 or video decoder 300 may determine a size of the current PU, wherein the determining the at least one non-adjacent candidate is based at least in part on the size of the current PU. In some examples, determining the at least one non-adjacent candidate comprises determining a horizontal offset relative to a top-left luma sample of the current PU and a vertical offset relative to the top-left luma sample of the current PU. In some examples, determining the at least one non-adjacent candidate further comprises adding the horizontal offset and the vertical offset to the top-left luma sample coordinate of the current PU. In some examples, video encoder 200 or video decoder 300 may select, in accordance with a first syntax element indicative of a level index and a second syntax element indicative of the horizontal offset and the vertical offset, one of offsetX=−iNADistanceHor−1 and offsetY=height+iNADistanceVer−1, offsetX=width+iNADistanceHor−1 and offsetY=−iNADistanceVer−1, offsetX=width>>1 and offsetY=−iNADistanceVer−1, offsetX=−iNADistanceHor−1 and offsetY=height>>1, or offsetX=−iNADistanceHor−1 and offsetY=−iNADistanceVer−1, to use to determine the horizontal offset and the vertical offset, wherein offsetX is the horizontal offset, offsetY is the vertical offset, width is a width of the current PU in a number of luma samples, height is a height of the current PU in a number of luma samples, and iNA represents the i-th non-adjacent candidate unit and iNADistanceHor=width*(the first syntax element+1) and iNADistanceVer=height*(the first syntax element+1).

In some examples, the number of candidates in the AMVP candidate list is greater than 2. In some examples, the number of candidates in the AMVP candidate list is 5.

In some examples, video encoder 200 or video decoder 300 may determine a respective template matching cost for each candidate in the AMVP candidate list and determine a motion vector predictor to be a candidate in the AMVP candidate list having a least template matching cost among a plurality of candidates in the AMVP candidate list.

In some examples, the AMVP candidate list comprises a template matching refined AMVP candidate and an unrefined AMVP candidate. In some examples, video encoder 200 or video decoder 300 may signal or parse an AMVP index, the AMVP index being indicative of a motion vector predictor being the template matching refined AMVP candidate or the unrefined AMVP candidate. In some examples, the AMVP index is equal to 0 and video encoder 200 or video decoder 300 may determine the motion vector predictor to be the template matching refined AMVP candidate. In some examples, the AMVP index is equal to 1 and video encoder 200 or video decoder 300 may determine the motion vector predictor to be the unrefined AMVP candidate. In some examples, video encoder 200 or video decoder 300 may determine a respective template matching cost for each candidate in the AMVP candidate list and refine, using template matching, an AMVP candidate having the minimum template matching cost to create the template matching refined AMVP candidate. In some examples, the unrefined AMVP candidate has a maximum motion vector distance with respect to the template matching refined AMVP candidate of any potential AMVP candidates. In some examples, the unrefined AMVP candidate has a minimum template matching cost to motion vector distance ratio with respect to the template matching refined AMVP candidate of any potential AMVP candidates. In some examples, coding includes encoding. In some examples, coding includes decoding.

Figure 11:
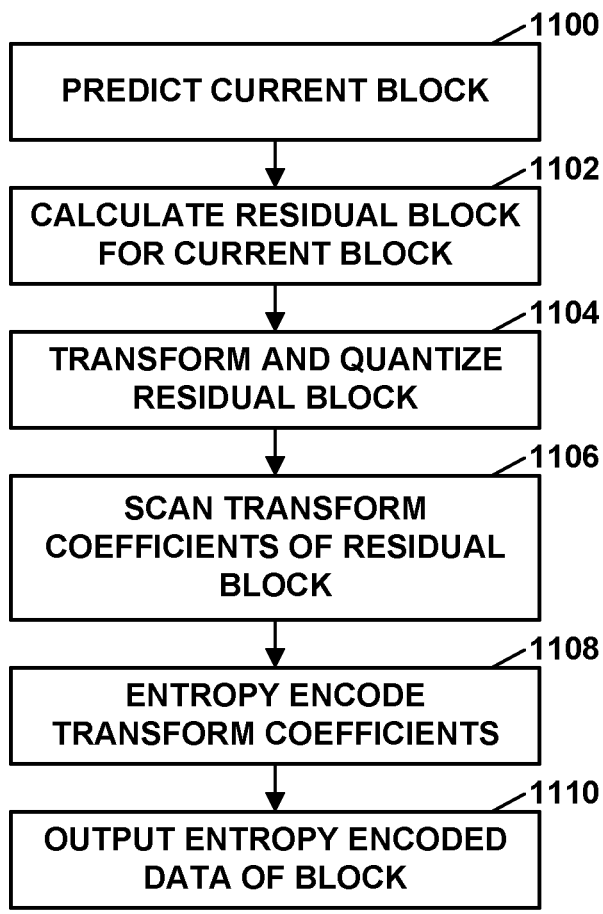
FIG. 11 is a flowchart illustrating an example method for encoding a current block in accordance with the techniques of this disclosure.

FIG. 11 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 11.

In this example, video encoder 200 initially predicts the current block (1100). For example, video encoder 200 may form a prediction block for the current block. When predicting the current block, video encoder 200 may employ the AMVP techniques of FIG. 10. For example, AMVP unit 223 (FIG. 3) may determine at least one of a temporal candidate or a history-based candidate. AMVP unit 223 may also determine at least one non-adjacent candidate from at least one non-adjacent candidate unit, wherein the at least one non-adjacent candidate unit is not adjacent to a current PU. AMVP unit 223 may determine an AMVP candidate list including the at least one of the temporal candidate or the history-based candidate and the at least one non-adjacent candidate. AMVP unit 223 may add the at least one non-adjacent candidate to the AMVP candidate list after the temporal candidate unit and/or before the history-based candidate unit. Video encoder 200 may then calculate a residual block for the current block (1102). To calculate the residual block, video encoder 200 may calculate a difference between the original, unencoded block and the prediction block for the current block. Video encoder 200 may then transform the residual block and quantize transform coefficients of the residual block (1104). Next, video encoder 200 may scan the quantized transform coefficients of the residual block (1106). During the scan, or following the scan, video encoder 200 may entropy encode the transform coefficients (1108). For example, video encoder 200 may encode the transform coefficients using CAVLC or CABAC. Video encoder 200 may then output the entropy encoded data of the block (1110).

Figure 12:
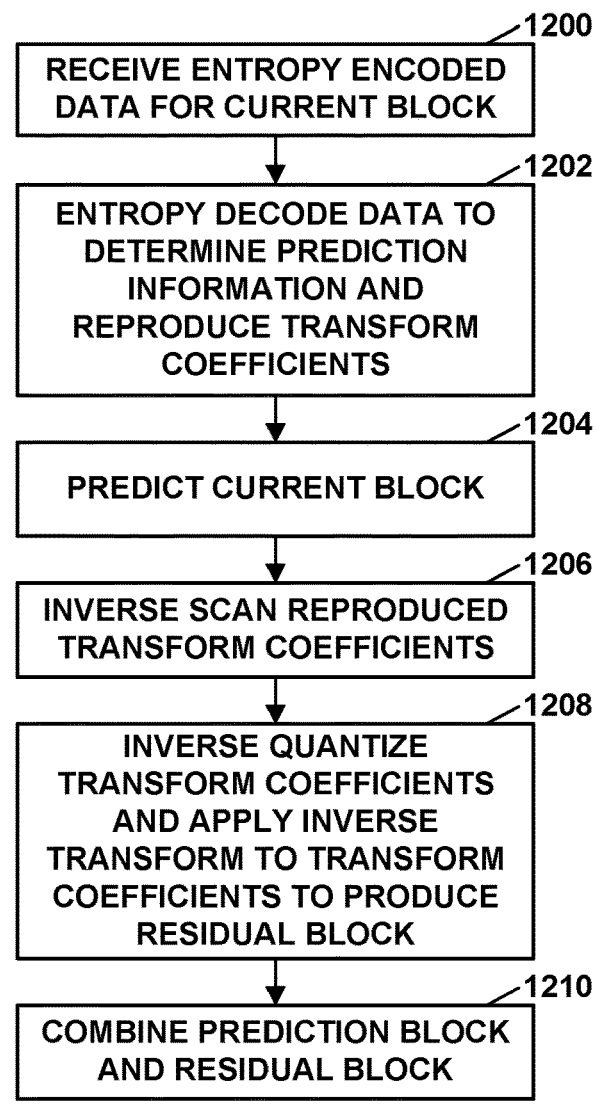
FIG. 12 is a flowchart illustrating an example method for decoding a current block in accordance with the techniques of this disclosure.

FIG. 12 is a flowchart illustrating an example method for decoding a current block of video data in accordance with the techniques of this disclosure. The current block may comprise a current CU. Although described with respect to video decoder 300 (FIGS. 1 and 4), it should be understood that other devices may be configured to perform a method similar to that of FIG. 12.

Video decoder 300 may receive entropy encoded data for the current block, such as entropy encoded prediction information and entropy encoded data for transform coefficients of a residual block corresponding to the current block (1200). Video decoder 300 may entropy decode the entropy encoded data to determine prediction information for the current block and to reproduce transform coefficients of the residual block (1202). Video decoder 300 may predict the current block (1204), e.g., using an intra- or inter-prediction mode as indicated by the prediction information for the current block, to calculate a prediction block for the current block. For example, video decoder 300 may use the AMVP techniques of FIG. 10 when predicting the current block. For example, AMVP unit 317 (FIG. 4) may determine at least one of a temporal candidate or a history-based candidate. AMVP unit 317 may also determine at least one non-adjacent candidate from at least one non-adjacent candidate unit, wherein the at least one non-adjacent candidate unit is not adjacent to a current PU. AMVP unit 317 may determine an AMVP candidate list including the at least one of the temporal candidate or the history-based candidate and the at least one non-adjacent candidate. AMVP unit 317 may add the at least one non-adjacent candidate to the AMVP candidate list after the temporal candidate unit and/or before the history-based candidate unit. Video decoder 300 may then inverse scan the reproduced transform coefficients (1206), to create a block of quantized transform coefficients. Video decoder 300 may then inverse quantize the transform coefficients and apply an inverse transform to the transform coefficients to produce a residual block (1208). Video decoder 300 may ultimately decode the current block by combining the prediction block and the residual block (1210).

This disclosure includes the following non-limiting clauses.

Clause 1A. A method of coding video data, the method comprising: determining an advanced motion vector predictor (AMVP) candidate list, wherein at least one candidate in the AMVP candidate list is a non-adjacent candidate, and wherein the non-adjacent candidate is not adjacent to a current prediction unit (PU); and coding the current PU based on the AMVP candidate list.

Clause 2A. The method of clause 1A, wherein determining the AMVP candidate list comprises: determining a size of the current PU; and based at least in part on the size of the current PU, determining the non-adjacent candidate.

Clause 3A. The method of any of clauses 1A-2A, wherein determining the AMVP candidate list comprises: determining a distance level; and based at least in part on the distance level, determining the non-adjacent candidate.

Clause 4A. The method of any of clauses 1A-3A, wherein a plurality of potential non-adjacent candidates are divided into a plurality of groups.

Clause 5A. The method of any of clauses 2A-4A, wherein determining the non-adjacent candidate comprises determining an x offset and a y offset.

Clause 6A. The method of clause 5A, wherein determining the non-adjacent candidate comprises adding the x offset and the y offset to a top-left luma sample coordinate of the current PU.

Clause 7A. The method of any of clauses 1A-6A, wherein the number of AMVP candidates in the AMVP candidate list is greater than 2.

Clause 8A. The method of clause 7A, wherein the number of AMVP candidates in the AMVP candidate list is 5.

Clause 9A. The method of any of clauses 1A-8A, wherein the non-adjacent candidate is added to the AMVP candidate list after any temporal candidates and before any history-based candidates.

Clause 10A. The method of any of clauses 1A-8A, wherein the non-adjacent candidate is added to the AMVP candidate list after any history-based candidates and before any zero candidates.

Clause 11A. The method of any of clauses 1A-8A, wherein the non-adjacent candidate is added to the AMVP candidate list after any spatial candidates and before any temporal candidates.

Clause 12A. The method of any of clauses 1A-8A, wherein determining the AMVP candidate list comprises determining the AMVP candidate list in an order based on a priority.

Clause 13A. The method of clause 12A, wherein the priority comprises: first, spatial left neighboring candidates; second, spatial left non-adjacent candidates; third, spatial above neighboring candidates; fourth, spatial above non-adjacent candidates; fifth, temporal candidates; sixth, history candidates; and seventh, zero MV candidates.

Clause 14A. The method of any of clauses 1A-13A, wherein the AMVP candidate list comprises an unrefined AMVP candidate.

Clause 15A. The method of any of clauses 1A-14A, further comprising parsing or signaling an AMVP index.

Clause 16A. The method of clause 15A, wherein the AMVP index is equal to 0 and wherein the method further comprises: determining a motion vector predictor to be a template matching refined AMVP candidate.

Clause 17A. The method of clause 15A, wherein the AMVP index is equal to 1 and wherein the method further comprises: determining a motion vector predictor to be an unrefined AMVP candidate.

Clause 18A. The method of any of clauses 1A-17A, wherein the AMVP candidate list comprises a template matching refined AMVP candidate and an unrefined AMVP candidate, and wherein the unrefined AMVP candidate is located further away from the current PU than the template matching refined AMVP candidate.

Clause 19A. The method of clause 18A, wherein the unrefined AMVP candidate has a maximum motion vector distance to the current PU of potential AMVP candidates.

Clause 20A. The method of clause 18A, wherein the unrefined AMVP candidate has a minimum template matching cost minus motion vector distance ratio of potential AMVP candidates.

Clause 21A. The method of any of clauses 1A-20A, wherein coding comprises decoding.

Clause 22A. The method of any of clauses 1A-21A, wherein coding comprises encoding.

Clause 23A. A device for coding video data, the device comprising one or more means for performing the method of any of clauses 1A-22A.

Clause 24A. The device of clause 23A, wherein the one or more means comprise one or more processors implemented in circuitry.

Clause 25A. The device of any of clauses 23A-24A, further comprising a memory to store the video data.

Clause 26A. The device of any of clauses 23A-25A, further comprising a display configured to display decoded video data.

Clause 27A. The device of any of clauses 23A-26A, wherein the device comprises one or more of a camera, a computer, a mobile device, a broadcast receiver device, or a set-top box.

Clause 28A. The device of any of clauses 23A-27A, wherein the device comprises a video decoder.

Clause 29A. The device of any of clauses 23A-28A, wherein the device comprises a video encoder.

Clause 30A. A computer-readable storage medium having stored thereon instructions that, when executed, cause one or more processors to perform the method of any of clauses 1A-2A2.

Clause 31A. A device for encoding video data, the device comprising: means for determining an advanced motion vector predictor (AMVP) candidate list, wherein at least one candidate in the AMVP candidate list is a non-adjacent candidate, and wherein the non-adjacent candidate is not adjacent to a current prediction unit (PU); and means for coding the current PU based on the AMVP candidate list.

Clause 1B. A method of coding video data, the method comprising: determining at least one of a temporal candidate or a history-based candidate; determining at least one non-adjacent candidate from at least one non-adjacent candidate unit, wherein the at least one non-adjacent candidate unit is not adjacent to a current prediction unit (PU); determining an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and coding the current PU based on the AMVP candidate list.

Clause 2B. The method of clause 1B, wherein determining the at least one non-adjacent candidate comprises selecting the at least one non-adjacent candidate unit from a group consisting of potential non-adjacent candidate units located one unit below and two units to the left of the current PU, two units above and one unit to the right of the current PU, two units above and two units to the left of the current PU, two units below and three units to the left of the current PU, three units above and two units to the right of the current PU, three units above the current PU, three units to the left of the current PU, three units above and three units to the left of the current PU, three units below and four units to the left of the current PU, four units above and three units to the right of the current PU, four units above the current PU, four units to the left of the current PU, four units above and four units to the left of the current PU, four units below and five units to the left of the current PU, five units above and four units to the right of the current PU, five units above the current PU, five units to the left of the current PU, and five units above and five units to the left of the current PU.

Clause 3B. The method of clause 1B or clause 2B, wherein a plurality of potential non-adjacent candidate units is divided into a plurality of groups and wherein the method further comprises: signaling or parsing a level index indicative of a group of the plurality of groups; and signaling or parsing a position index indicative of one of the potential non-adjacent candidate units belonging to the group indicated by the level index, wherein the at least one non-adjacent candidate unit comprises the one of the potential non-adjacent candidate units.

Clause 4B. The method of clause 3B, wherein the plurality of groups comprises: a first group of potential non-adjacent candidate units located one unit below and two units to the left of the current PU, two units above and one unit to the right of the current PU, and two units above and two units to the left of the current PU; a second group of potential non-adjacent candidate units located two units below and three units to the left of the current PU, three units above and two units to the right of the current PU, three units above the current PU, three units to the left of the current PU, three units above and three units to the left of the current PU; a third group of potential non-adjacent candidate units located three units below and four units to the left of the current PU, four units above and three units to the right of the current PU, four units above the current PU, four units to the left of the current PU, four units above and four units to the left of the current PU; and a fourth group of potential non-adjacent candidate units located four units below and five units to the left of the current PU, five units above and four units to the right of the current PU, five units above the current PU, five units to the left of the current PU, five units above and five units to the left of the current PU.

Clause 5B. The method of any of clauses 1B-4B, further comprising: determining a size of the current PU, wherein the determining the at least one non-adjacent candidate is based at least in part on the size of the current PU.

Clause 6B. The method of any of clauses 1B-5B, wherein the determining the at least one non-adjacent candidate comprises determining a horizontal offset relative to a top-left luma sample of the current PU and a vertical offset relative to the top-left luma sample of the current PU.

Clause 7B. The method of clause 6B, wherein the determining the at least one non-adjacent candidate unit further comprises adding the horizontal offset and the vertical offset to a top-left luma sample coordinate of the current PU.

Clause 8B. The method of clause 6B or clause 7B, further comprising selecting, in accordance with a first syntax element indicative of a level index and a second syntax element indicative of the horizontal offset and the vertical offset, one of offsetX=−iNADistanceHor−1 and offsetY=height+iNADistanceVer−1, offsetX=width+iNADistanceHor−1 and offsetY=−iNADistanceVer−1, offsetX=width>>1 and offsetY=−iNADistanceVer−1, offsetX=−iNADistanceHor−1 and offsetY=height>>1, or offsetX=−iNADistanceHor−1 and offsetY=−iNADistanceVer−1, to use to determine the horizontal offset and the vertical offset, wherein offsetX is the horizontal offset, offsetY is the vertical offset, width is a width of the current PU in a number of luma samples, height is a height of the current PU in a number of luma samples, and iNA represents the i-th non-adjacent candidate unit and iNADistanceHor=width*(the level index+1) and iNADistanceVer=height*(the level index+1).

Clause 9B. The method of any of clauses 1B-8B, wherein a number of candidates in the AMVP candidate list is greater than two.

Clause 10B. The method of clause 9B, wherein the number of candidates in the AMVP candidate list is five.

Clause 11B. The method of any of clauses 1B-10B, further comprising: determining a respective template matching cost for each candidate in the AMVP candidate list; and determining a motion vector predictor to be a candidate in the AMVP candidate list having a least template matching cost among a plurality of candidates in the AMVP candidate list.

Clause 12B. The method of any of clauses 1B-11B, wherein the AMVP candidate list comprises a template matching refined AMVP candidate and an unrefined AMVP candidate, the method further comprising signaling or parsing an AMVP index, the AMVP index being indicative of a motion vector predictor being the template matching refined AMVP candidate or the unrefined AMVP candidate.

Clause 13B. The method of clause 12B, wherein the AMVP index is equal to 0 and wherein the method further comprises: determining the motion vector predictor to be the template matching refined AMVP candidate.

Clause 14B. The method of clause 12B, wherein the AMVP index is equal to 1 and wherein the method further comprises: determining the motion vector predictor to be the unrefined AMVP candidate.

Clause 15B. The method of any of clauses 12B-14B, further comprising: determining a respective template matching cost for each candidate in the AMVP candidate list; and refining, using template matching, an AMVP candidate having a minimum template matching cost to create the template matching refined AMVP candidate.

Clause 16B. The method of any of clauses 12B-15B, wherein the unrefined AMVP candidate unit has a maximum motion vector distance with respect to the template matching refined AMVP candidate of any potential AMVP candidates.

Clause 17B. The method of any of clauses 12B-15B, wherein the unrefined AMVP candidate has a minimum template matching cost to motion vector distance ratio with respect to the template matching refined AMVP candidate of any potential AMVP candidates.

Clause 18B. The method of any of clauses 1B-17B, wherein coding comprises encoding.

Clause 19B. The method of any of clauses 1B-17B, wherein coding comprises decoding.

Clause 20B. A device for coding video data, the device comprising: memory configured to store the video data; and one or more processors implemented in circuitry and communicatively coupled to the memory, the one or more processors being configured to: determine at least one of a temporal candidate or a history-based candidate; determine at least one non-adjacent candidate from at least one non-adjacent candidate unit, wherein the at least one non-adjacent candidate unit is not adjacent to a current prediction unit (PU); determine an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and code the current PU based on the AMVP candidate list.

Clause 21B. The device of clause 20B, wherein as part of determining the at least one non-adjacent candidate, the one or more processors are configured to select the at least one non-adjacent candidate unit from a group of potential non-adjacent candidate units consisting of units located one unit below and two units to the left of the current PU, two units above and one unit to the right of the current PU, two units above and two units to the left of the current PU, two units below and three units to the left of the current PU, three units above and two units to the right of the current PU, three units above the current PU, three units to the left of the current PU, three units above and three units to the left of the current PU, three units below and four units to the left of the current PU, four units above and three units to the right of the current PU, four units above the current PU, four units to the left of the current PU, four units above and four units to the left of the current PU, four units below and five units to the left of the current PU, five units above and four units to the right of the current PU, five units above the current PU, five units to the left of the current PU, and five units above and five units to the left of the current PU.

Clause 22B. The device of clause 20B or clause 21B, wherein a plurality of potential non-adjacent candidate units is divided into a plurality of groups and wherein one or more processors are further configured to: signal or parse a level index indicative of a group of the plurality of groups; and signal or parse a position index indicative of one of the potential non-adjacent candidate units belonging to the group indicated by the level index, wherein the at least one non-adjacent candidate unit comprises the one of the potential non-adjacent candidate units.

Clause 23B. The device of clause 22B, wherein the plurality of groups comprises: a first group of potential non-adjacent candidate units located one unit below and two units to the left of the current PU, two units above and one unit to the right of the current PU, and two units above and two units to the left of the current PU; a second group of potential non-adjacent candidate units located two units below and three units to the left of the current PU, three units above and two units to the right of the current PU, three units above the current PU, three units to the left of the current PU, three units above and three units to the left of the current PU; a third group of potential non-adjacent candidate units located three units below and four units to the left of the current PU, four units above and three units to the right of the current PU, four units above the current PU, four units to the left of the current PU, four units above and four units to the left of the current PU; and a fourth group of potential non-adjacent candidate units located four units below and five units to the left of the current PU, five units above and four units to the right of the current PU, five units above the current PU, five units to the left of the current PU, five units above and five units to the left of the current PU.

Clause 24B. The device of any of clauses 20B-23B, wherein the one or more processors are further configured to: determine a size of the current PU, wherein the one or more processors are configured to determine the at least one non-adjacent candidate based at least in part on the size of the current PU.

Clause 25B. The device of any of clauses 20B-24B, wherein as part of determining the at least one non-adjacent candidate, the one or more processors are configured to determine a horizontal offset relative to a top-left luma sample of the current PU and a vertical offset relative to the top-left luma sample of the current PU.

Clause 26B. The device of clause 25B, wherein as part of determining the at least one non-adjacent candidate unit, the one or more processors are further configured to adding the horizontal offset and the vertical offset to a top-left luma sample coordinate of the current PU.

Clause 27B. The device of clause 25B or 26B, wherein the one or more processors are further configured to select, in accordance with a first syntax element indicative of a level index and a second syntax element indicative of the horizontal offset and the vertical offset, one of offsetX=−iNADistanceHor−1 and offsetY=height+iNADistanceVer−1, offsetX=width+iNADistanceHor−1 and offsetY=−iNADistanceVer−1, offsetX=width>>1 and offsetY=−iNADistanceVer−1, offsetX=−iNADistanceHor−1 and offsetY=height>>1, or offsetX=−iNADistanceHor−1 and offsetY=−iNADistanceVer−1, to use to determine the horizontal offset and the vertical offset, wherein offsetX is the horizontal offset, offsetY is the vertical offset, width is a width of the current PU in a number of luma samples, height is a height of the current PU in a number of luma samples, and iNA represents the i-th non-adjacent candidate unit and iNADistanceHor=width*(the level index+1) and iNADistanceVer=height*(the level index+1).

Clause 28B. The device of any of clauses 20B-27B, wherein a number of candidates in the AMVP candidate list is greater than two.

Clause 29B. The device of clause 28B, wherein the number of candidates in the AMVP candidate list is five.

Clause 30B. The device of any of clauses 20B-29B, wherein the one or more processors are further configured to: determine a respective template matching cost for each candidate in the AMVP candidate list; and determine a motion vector predictor to be a candidate in the AMVP candidate list having a least template matching cost among a plurality of candidates in the AMVP candidate list.

Clause 31B. The device of any of clauses 20B-30B, wherein the AMVP candidate list comprises a template matching refined AMVP candidate and an unrefined AMVP candidate, and wherein the one or more processors are further configured to signal or parse an AMVP index, the AMVP index being indicative of a motion vector predictor being the template matching refined AMVP candidate or the unrefined AMVP candidate.

Clause 32B. The device of clause 31B, wherein the AMVP index is equal to 0 and wherein the one or more processors are further configured to: determine the motion vector predictor to be the template matching refined AMVP candidate.

Clause 33B. The device of clause 31B, wherein the AMVP index is equal to 1 and wherein the one or more processors are further configured to: determine the motion vector predictor to be the unrefined AMVP candidate.

Clause 34B. The device of any of clauses 31B-33B, wherein the one or more processors are further configured to: determine a respective template matching cost for each candidate in the AMVP candidate list; and refine, using template matching, an AMVP candidate having a minimum template matching cost to create the template matching refined AMVP candidate.

Clause 35B. The device of any of clauses 31B-34B, wherein the unrefined AMVP candidate has a maximum motion vector distance with respect to the template matching refined AMVP candidate of any potential AMVP candidates.

Clause 36B. The device of any of clauses 31B-34B, wherein the unrefined AMVP candidate has a minimum template matching cost to motion vector distance ratio with respect to the template matching refined AMVP candidate of any potential AMVP candidates.

Clause 37B. The device of any of clauses 20B-36B, further comprising a display configured to display decoded video data.

Clause 38B. The device of any of clauses 20B-37B, further comprising a camera configured to capture the video data.

Clause 39B. A computer-readable storage medium having stored thereon instructions that, when executed, cause one or more processors to: determine at least one of a temporal candidate or a history-based candidate; determine at least one non-adjacent candidate from at least one non-adjacent candidate unit, wherein the at least one non-adjacent candidate unit is not adjacent to a current prediction unit (PU); determine an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and code the current PU based on the AMVP candidate list.

Clause 40B. A device for coding video data, the device comprising: means for determining at least one of a temporal candidate or a history-based candidate; means for determining at least one non-adjacent candidate from at least one non-adjacent candidate unit, wherein the at least one non-adjacent candidate unit is not adjacent to a current prediction unit (PU); means for determining an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate; and means for coding the current PU based on the AMVP candidate list.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising: determining at least one of a temporal candidate or a history-based candidate; determining at least one non-adjacent candidate from at least one non-adjacent candidate unit, wherein the at least one non-adjacent candidate unit is not adjacent to a current prediction unit (PU); determining an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate, and wherein the AMVP candidate list comprises a template matching refined AMVP candidate and an unrefined AMVP candidate; signaling or parsing an AMVP index, the AMVP index being indicative of a motion vector predictor being the template matching refined AMVP candidate or the unrefined AMVP candidate; and coding the current PU based on the motion vector predictor, wherein the unrefined AMVP candidate has a minimum template matching cost to motion vector distance ratio with respect to the template matching refined AMVP candidate of any potential AMVP candidates.

2. The method of claim 1, wherein the AMVP index is equal to 0, and wherein the method further comprises: determining the motion vector predictor to be the template matching refined AMVP candidate.

3. The method of claim 1, wherein the AMVP index is equal to 1, and wherein the method further comprises: determining the motion vector predictor to be the unrefined AMVP candidate.

4. The method of claim 1, further comprising: determining a respective template matching cost for each candidate in the AMVP candidate list; and refining, using template matching, an AMVP candidate having a minimum template matching cost to create the template matching refined AMVP candidate.

5. The method of claim 1, wherein the unrefined AMVP candidate has a maximum motion vector distance with respect to the template matching refined AMVP candidate of any potential AMVP candidates.

6. The method of claim 1, wherein determining the at least one non-adjacent candidate comprises selecting the at least one non-adjacent candidate unit from a group consisting of potential non-adjacent candidate units located one unit below and two units to the left of the current PU, two units above and one unit to the right of the current PU, two units above and two units to the left of the current PU, two units below and three units to the left of the current PU, three units above and two units to the right of the current PU, three units above the current PU, three units to the left of the current PU, three units above and three units to the left of the current PU, three units below and four units to the left of the current PU, four units above and three units to the right of the current PU, four units above the current PU, four units to the left of the current PU, four units above and four units to the left of the current PU, four units below and five units to the left of the current PU, five units above and four units to the right of the current PU, five units above the current PU, five units to the left of the current PU, and five units above and five units to the left of the current PU.

7. The method of claim 1, wherein a plurality of potential non-adjacent candidate units is divided into a plurality of groups and wherein the method further comprises: signaling or parsing a level index indicative of a group of the plurality of groups; and signaling or parsing a position index indicative of one of the potential non-adjacent candidate units belonging to the group indicated by the level index, wherein the at least one non-adjacent candidate unit comprises the one of the potential non-adjacent candidate units.

8. The method of claim 7, wherein the plurality of groups comprises: a first group of potential non-adjacent candidate units located one unit below and two units to the left of the current PU, two units above and one unit to the right of the current PU, and two units above and two units to the left of the current PU; a second group of potential non-adjacent candidate units located two units below and three units to the left of the current PU, three units above and two units to the right of the current PU, three units above the current PU, three units to the left of the current PU, three units above and three units to the left of the current PU; a third group of potential non-adjacent candidate units located three units below and four units to the left of the current PU, four units above and three units to the right of the current PU, four units above the current PU, four units to the left of the current PU, four units above and four units to the left of the current PU; and a fourth group of potential non-adjacent candidate units located four units below and five units to the left of the current PU, five units above and four units to the right of the current PU, five units above the current PU, five units to the left of the current PU, five units above and five units to the left of the current PU.

9. The method of claim 1, further comprising: determining a size of the current PU, wherein the determining the at least one non-adjacent candidate is based at least in part on the size of the current PU.

10. The method of claim 1, wherein the determining the at least one non-adjacent candidate comprises determining a horizontal offset relative to a top-left luma sample of the current PU and a vertical offset relative to the top-left luma sample of the current PU.

11. The method of claim 10, wherein the determining the at least one non-adjacent candidate unit further comprises adding the horizontal offset and the vertical offset to a top-left luma sample coordinate of the current PU.

12. The method of claim 10, further comprising selecting, in accordance with a first syntax element indicative of a level index and a second syntax element indicative of the horizontal offset and the vertical offset, one of offsetX=−iNADistanceHor−1 and offsetY=height+iNADistanceVer−1, offsetX=width+iNADistanceHor−1 and offsetY=−iNADistanceVer−1, offsetX=width >>1 and offsetY=−iNADistanceVer−1, offsetX=−iNADistanceHor−1 and offsetY=height >>1, or offsetX=−iNADistanceHor−1 and offsetY=−iNADistanceVer−1, to use to determine the horizontal offset and the vertical offset, wherein offsetX is the horizontal offset, offsetY is the vertical offset, width is a width of the current PU in a number of luma samples, height is a height of the current PU in a number of luma samples, and iNA represents an i-th non-adjacent candidate unit and iNADistanceHor=width * (the level index+1) and iNADistanceVer=height * (the level index+1).

13. The method of claim 10, wherein a number of candidates in the AMVP candidate list is greater than two.

14. The method of claim 13, wherein the number of candidates in the AMVP candidate list is five.

15. The method of claim 1, further comprising: determining a respective template matching cost for each candidate in the AMVP candidate list; and determining the motion vector predictor to be a candidate in the AMVP candidate list having a least template matching cost among a plurality of candidates in the AMVP candidate list.

16. The method of claim 1, wherein coding comprises encoding.

17. The method of claim 1, wherein coding comprises decoding.

18. A device for coding video data, the device comprising: one or more memories configured to store the video data; and one or more processors implemented in circuitry and communicatively coupled to the one or more memories, the one or more processors being configured to: determine at least one of a temporal candidate or a history-based candidate; determine at least one non-adjacent candidate from at least one non-adjacent candidate unit, wherein the at least one non-adjacent candidate unit is not adjacent to a current prediction unit (PU); determine an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate, and wherein the AMVP candidate list comprises a template matching refined AMVP candidate and an unrefined AMVP candidate; signal or parse an AMVP index, the AMVP index being indicative of a motion vector predictor being the template matching refined AMVP candidate or the unrefined AMVP candidate; and code the current PU based on the motion vector predictor, wherein the unrefined AMVP candidate has a minimum template matching cost to motion vector distance ratio with respect to the template matching refined AMVP candidate of any potential AMVP candidates.

19. The device of claim 18, wherein the AMVP index is equal to 0, and wherein the one or more processors are further configured to: determine the motion vector predictor to be the template matching refined AMVP candidate.

20. The device of claim 18, wherein the AMVP index is equal to 1, and wherein the one or more processors are further configured to: determine the motion vector predictor to be the unrefined AMVP candidate.

21. The device of claim 18, wherein the one or more processors are further configured to: determine a respective template matching cost for each candidate in the AMVP candidate list; and refine, using template matching, an AMVP candidate having a minimum template matching cost to create the template matching refined AMVP candidate.

22. The device of claim 18, wherein the unrefined AMVP candidate has a maximum motion vector distance with respect to the template matching refined AMVP candidate of any potential AMVP candidates.

23. The device of claim 18, wherein as part of determining the at least one non-adjacent candidate, the one or more processors are configured to select the at least one non-adjacent candidate unit from a group of potential non-adjacent candidate units consisting of units located one unit below and two units to the left of the current PU, two units above and one unit to the right of the current PU, two units above and two units to the left of the current PU, two units below and three units to the left of the current PU, three units above and two units to the right of the current PU, three units above the current PU, three units to the left of the current PU, three units above and three units to the left of the current PU, three units below and four units to the left of the current PU, four units above and three units to the right of the current PU, four units above the current PU, four units to the left of the current PU, four units above and four units to the left of the current PU, four units below and five units to the left of the current PU, five units above and four units to the right of the current PU, five units above the current PU, five units to the left of the current PU, and five units above and five units to the left of the current PU.

24. The device of claim 18, wherein a plurality of potential non-adjacent candidate units is divided into a plurality of groups and wherein one or more processors are further configured to: signal or parse a level index indicative of a group of the plurality of groups; and signal or parse a position index indicative of one of the potential non-adjacent candidate units belonging to the group indicated by the level index, wherein the at least one non-adjacent candidate unit comprises the one of the potential non-adjacent candidate units.

25. The device of claim 24, wherein the plurality of groups comprises: a first group of potential non-adjacent candidate units located one unit below and two units to the left of the current PU, two units above and one unit to the right of the current PU, and two units above and two units to the left of the current PU; a second group of potential non-adjacent candidate units located two units below and three units to the left of the current PU, three units above and two units to the right of the current PU, three units above the current PU, three units to the left of the current PU, three units above and three units to the left of the current PU; a third group of potential non-adjacent candidate units located three units below and four units to the left of the current PU, four units above and three units to the right of the current PU, four units above the current PU, four units to the left of the current PU, four units above and four units to the left of the current PU; and a fourth group of potential non-adjacent candidate units located four units below and five units to the left of the current PU, five units above and four units to the right of the current PU, five units above the current PU, five units to the left of the current PU, five units above and five units to the left of the current PU.

26. The device of claim 18, wherein the one or more processors are further configured to: determine a size of the current PU, wherein the one or more processors are configured to determine the at least one non-adjacent candidate based at least in part on the size of the current PU.

27. The device of claim 18, wherein as part of determining the at least one non-adjacent candidate, the one or more processors are configured to determine a horizontal offset relative to a top-left luma sample of the current PU and a vertical offset relative to the top-left luma sample of the current PU.

28. The device of claim 27, wherein as part of determining the at least one non-adjacent candidate unit, the one or more processors are further configured to adding the horizontal offset and the vertical offset to a top-left luma sample coordinate of the current PU.

29. The device of claim 27, wherein the one or more processors are further configured to select, in accordance with a first syntax element indicative of a level index and a second syntax element indicative of the horizontal offset and the vertical offset, one of offsetX=−iNADistanceHor−1 and offsetY=height+iNADistanceVer−1, offsetX=width+iNADistanceHor−1 and offsetY=−iNADistanceVer−1, offsetX=width >>1 and offsetY=−iNADistanceVer−1, offsetX=−iNADistanceHor−1 and offsetY=height >>1, or offsetX=−iNADistanceHor−1 and offsetY=−iNADistanceVer−1, to use to determine the horizontal offset and the vertical offset, wherein offsetX is the horizontal offset, offsetY is the vertical offset, width is a width of the current PU in a number of luma samples, height is a height of the current PU in a number of luma samples, and iNA represents an i-th non-adjacent candidate unit and iNADistanceHor=width * (the level index+1) and iNADistanceVer=height * (the level index+1).

30. The device of claim 18, wherein a number of candidates in the AMVP candidate list is greater than two.

31. The device of claim 30, wherein the number of candidates in the AMVP candidate list is five.

32. The device of claim 18, wherein the one or more processors are further configured to: determine a respective template matching cost for each candidate in the AMVP candidate list; and determine a motion vector predictor to be a candidate in the AMVP candidate list having a least template matching cost among a plurality of candidates in the AMVP candidate list.

33. The device of claim 18, further comprising a display configured to display decoded video data.

34. The device of claim 18, further comprising a camera configured to capture the video data.

35. Computer-readable storage media having stored thereon instructions that, when executed, cause one or more processors to: determine at least one of a temporal candidate or a history-based candidate; determine at least one non-adjacent candidate from at least one non-adjacent candidate unit, wherein the at least one non-adjacent candidate unit is not adjacent to a current prediction unit (PU); determine an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate, and wherein the AMVP candidate list comprises a template matching refined AMVP candidate and an unrefined AMVP candidate; signal or parse an AMVP index, the AMVP index being indicative of a motion vector predictor being the template matching refined AMVP candidate or the unrefined AMVP candidate; and code the current PU based on the motion vector predictor, wherein the unrefined AMVP candidate has a minimum template matching cost to motion vector distance ratio with respect to the template matching refined AMVP candidate of any potential AMVP candidates.

36. A device for coding video data, the device comprising: means for determining at least one of a temporal candidate or a history-based candidate; means for determining at least one non-adjacent candidate from at least one non-adjacent candidate unit, wherein the at least one non-adjacent candidate unit is not adjacent to a current prediction unit (PU); means for determining an advanced motion vector predictor (AMVP) candidate list comprising the at least one of the temporal candidate or the history-based candidate and the at least one non-adjacent candidate, wherein the at least one non-adjacent candidate is added to the AMVP candidate list at least one of after the temporal candidate or before the history-based candidate, and wherein the AMVP candidate list comprises a template matching refined AMVP candidate and an unrefined AMVP candidate; means for signaling or parsing an AMVP index, the AMVP index being indicative of a motion vector predictor being the template matching refined AMVP candidate or the unrefined AMVP candidate; and means for coding the current PU based on the motion vector predictor, wherein the unrefined AMVP candidate has a minimum template matching cost to motion vector distance ratio with respect to the template matching refined AMVP candidate of any potential AMVP candidates.

\* \* \* \* \*